United States Patent
Speer

(10) Patent No.: US 11,420,433 B2
(45) Date of Patent: *Aug. 23, 2022

(54) COMPOSITE PANEL HAVING PERFORATED FOAM CORE AND METHOD OF MAKING THE SAME

(71) Applicant: Wabash National, L.P., Lafayette, IN (US)

(72) Inventor: Dwaine D. Speer, West Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 723 days.

This patent is subject to a terminal disclaimer.

(21) Appl. No.: 15/912,970

(22) Filed: Mar. 6, 2018

(65) Prior Publication Data

US 2018/0194124 A1  Jul. 12, 2018

Related U.S. Application Data

(60) Continuation of application No. 14/454,097, filed on Aug. 7, 2014, now Pat. No. 9,908,315, which is a
(Continued)

(51) Int. Cl.
*B32B 3/26* (2006.01)
*B29C 48/00* (2019.01)
(Continued)

(52) U.S. Cl.
CPC .............. *B32B 37/24* (2013.01); *B29C 48/07* (2019.02); *B32B 3/266* (2013.01); *B32B 5/18* (2013.01);
(Continued)

(58) Field of Classification Search
CPC ....... B32B 15/20; B32B 37/24; B32B 15/085; B32B 15/08; B32B 3/266; B32B 27/32;
(Continued)

(56) References Cited

U.S. PATENT DOCUMENTS 2,294,930 A    9/1942  Palmquist
2,719,809 A   10/1955  John
(Continued)

FOREIGN PATENT DOCUMENTS

CA    2165016 A1    6/1996
EP    2133184 A1   12/2009
(Continued)

OTHER PUBLICATIONS

International Search Report and Written Opinion issued in corresponding PCT/US2018/018151 dated Apr. 5, 2018, 6 pages.
(Continued)

*Primary Examiner* — Seyed Masoud Malekzadeh
(74) *Attorney, Agent, or Firm* — Quarles & Brady LLP

(57) ABSTRACT

A method of forming a composite panel in-line is disclosed. The method includes the steps of forming a hot thermal plastic sheet of material and providing the hot thermal plastic sheet of material to a punch having punch members extending outwardly therefrom. The hot thermal plastic sheet of material is advanced through the punch in order to form apertures through the hot thermal plastic sheet of material such that each aperture extends from an outer surface of the hot thermal plastic sheet of material to an inner surface of the hot thermal plastic sheet of material. An outer metal sheet and an inner metal sheet, respectively, are coupled to opposing sides of the hot thermal plastic sheet of material.

18 Claims, 12 Drawing Sheets

Related U.S. Application Data division of application No. 13/204,762, filed on Aug. 8, 2011, now abandoned.

(60) Provisional application No. 61/372,259, filed on Aug. 10, 2010.

(51) Int. Cl.

| | | |
|---|---|---|
| *B32B 37/24* | (2006.01) | |
| *B32B 5/18* | (2006.01) | |
| *B32B 15/085* | (2006.01) | |
| *B32B 15/18* | (2006.01) | |
| *B32B 15/20* | (2006.01) | |
| *B32B 27/32* | (2006.01) | |
| *B32B 15/08* | (2006.01) | |
| *B29C 48/07* | (2019.01) | |
| *B62D 29/00* | (2006.01) | |
| *B32B 15/04* | (2006.01) | |
| *B29C 48/355* | (2019.01) | |

(52) U.S. Cl.
CPC ............ *B32B 15/08* (2013.01); *B32B 15/085* (2013.01); *B32B 15/18* (2013.01); *B32B 15/20* (2013.01); *B32B 27/32* (2013.01); *B62D 29/002* (2013.01); *B62D 29/005* (2013.01); *B29C 48/0021* (2019.02); *B29C 48/355* (2019.02); *B29C 2793/00* (2013.01); *B29C 2793/009* (2013.01); *B29C 2793/0018* (2013.01); *B29C 2793/0045* (2013.01); *B32B 15/04* (2013.01); *B32B 2250/00* (2013.01); *B32B 2250/03* (2013.01); *B32B 2250/40* (2013.01); *B32B 2250/44* (2013.01); *B32B 2605/00* (2013.01); *B32B 2605/08* (2013.01); *Y10T 29/49826* (2015.01); *Y10T 428/24273* (2015.01)

(58) Field of Classification Search
CPC ........... B32B 15/18; B32B 5/18; B32B 15/04; B32B 2250/03; B32B 2250/44; B32B 2605/00; B32B 2250/00; B29C 2793/0045; B29C 2793/0018; B29C 2793/0009; B29C 2793/00; B29C 53/00; B29C 51/00; B29C 51/002; B29C 2793/009; B29C 48/07; B29C 48/0021; B29C 48/355; B62D 29/002; B62D 29/005
USPC .................. 264/153, 154, 155, 156; 425/398
See application file for complete search history.

(56) References Cited

U.S. PATENT DOCUMENTS

| | | | |
|---|---|---|---|
| 2,934,372 A | 4/1960 | Jewell | |
| 3,072,225 A | 1/1963 | Cremer | |
| 3,249,659 A | 5/1966 | Voelker | |
| 3,318,267 A * | 5/1967 | Artiaga | A21C 11/10 |
| | | | 425/290 |
| 3,420,023 A | 1/1969 | Werner | |
| 3,496,259 A * | 2/1970 | Lloydm | B29C 67/00 |
| | | | 28/165 |
| 3,515,615 A | 6/1970 | Yoichi et al. | |
| 3,617,351 A | 11/1971 | Long | |
| 3,817,671 A | 6/1974 | Lemelson | |
| 4,128,369 A | 12/1978 | Kemerer et al. | |
| 4,340,129 A | 7/1982 | Salyers | |
| 4,466,845 A * | 8/1984 | Fortuna | B29C 51/04 |
| | | | 264/68 |
| 4,557,100 A | 12/1985 | Gorges | |
| 4,578,297 A | 3/1986 | Duncan | |
| 4,701,369 A | 10/1987 | Duncan | |
| 4,708,757 A | 11/1987 | Guthrie | |
| 4,709,781 A | 12/1987 | Scherzer | |
| 4,783,287 A | 11/1988 | Eichberger et al. | |
| 4,796,397 A | 1/1989 | Capaul | |
| 4,817,264 A | 4/1989 | Worthing | |
| 4,879,152 A | 11/1989 | Green | |
| 4,888,234 A * | 12/1989 | Smith | B29C 70/48 |
| | | | 28/107 |
| 4,930,266 A | 6/1990 | Calhoun et al. | |
| 4,940,279 A | 7/1990 | Abott et al. | |
| 5,042,395 A | 8/1991 | Wackerle et al. | |
| 5,066,531 A * | 11/1991 | Legg | B29C 66/1122 |
| | | | 428/137 |
| 5,186,996 A | 2/1993 | Alts | |
| 5,214,991 A | 6/1993 | Shimizu et al. | |
| 5,275,848 A | 1/1994 | Mito et al. | |
| 5,328,744 A | 7/1994 | Kaufmann et al. | |
| 5,366,578 A * | 11/1994 | Vanhook | B29C 48/08 |
| | | | 264/145 |
| 5,424,016 A * | 6/1995 | Kolosowski | B29C 44/3402 |
| | | | 425/290 |
| 5,507,405 A | 4/1996 | Thomas et al. | |
| 5,518,802 A * | 5/1996 | Colvin | B32B 3/12 |
| | | | 428/166 |
| 5,554,246 A | 9/1996 | Anwyll, Jr. | |
| 5,580,409 A * | 12/1996 | Andersen | B29C 51/10 |
| | | | 264/133 |
| 5,580,636 A | 12/1996 | Kampmann et al. | |
| 5,585,058 A * | 12/1996 | Kolosowski | B29C 44/3402 |
| | | | 264/52 |
| 5,604,021 A | 2/1997 | Wagner | |
| 5,698,308 A | 12/1997 | Sumiya et al. | |
| 5,702,798 A | 12/1997 | Sugita et al. | |
| 5,718,965 A | 2/1998 | Shiroeda et al. | |
| 5,774,972 A | 7/1998 | Ehrlich | |
| 5,779,847 A | 7/1998 | Groeger | |
| 5,851,342 A | 12/1998 | Vydra et al. | |
| 5,860,693 A | 1/1999 | Erlich | |
| 5,899,037 A | 5/1999 | Josey | |
| 5,904,891 A * | 5/1999 | Mizuno | B29C 43/36 |
| | | | 264/156 |
| 5,919,545 A | 7/1999 | Giezendanner et al. | |
| 5,979,684 A | 11/1999 | Ohnishi et al. | |
| 5,997,076 A | 12/1999 | Erlich | |
| 6,007,890 A | 12/1999 | Deblander | |
| 6,071,444 A * | 6/2000 | Worrell, Jr. | C06B 45/00 |
| | | | 264/156 |
| 6,080,495 A | 6/2000 | Wright | |
| 6,099,683 A * | 8/2000 | Meier | B32B 7/12 |
| | | | 156/292 |
| 6,146,563 A * | 11/2000 | Holland | B29C 51/02 |
| | | | 264/153 |
| 6,199,939 B1 | 3/2001 | Erlich | |
| 6,220,651 B1 | 4/2001 | Erlich | |
| 6,266,865 B1 | 7/2001 | Ehrlich | |
| 6,276,748 B1 | 8/2001 | Gobessi et al. | |
| 6,355,302 B1 | 3/2002 | Vandenberg et al. | |
| 6,368,721 B1 | 4/2002 | Watanabe et al. | |
| 6,383,559 B1 | 5/2002 | Nakamura et al. | |
| 6,412,854 B2 | 7/2002 | Erlich | |
| 6,537,413 B1 | 3/2003 | Hochet et al. | |
| 6,546,694 B2 | 4/2003 | Clifford | |
| 6,635,202 B1 | 10/2003 | Bugg et al. | |
| 6,638,636 B2 | 10/2003 | Tucker | |
| 6,680,017 B1 | 1/2004 | Koch et al. | |
| RE38,505 E | 4/2004 | Wright | |
| RE38,508 E | 4/2004 | Wright | |
| 6,824,851 B1 | 11/2004 | Locher et al. | |
| 6,843,525 B2 | 1/2005 | Preisler | |
| 6,852,386 B2 | 2/2005 | Nadezhdin et al. | |
| 6,866,492 B2 | 3/2005 | Hauber et al. | |
| 6,986,546 B2 | 1/2006 | Erlich | |
| 7,014,253 B2 | 3/2006 | Oren | |
| 7,017,981 B2 | 3/2006 | Strohmavr et al. | |
| 7,056,567 B2 | 6/2006 | O'Neill et al. | |
| 7,069,702 B2 | 7/2006 | Erlich | |
| 7,128,365 B2 | 10/2006 | Kiesewetter et al. | |
| 7,155,797 B2 | 1/2007 | Kim | |

(56) References Cited

U.S. PATENT DOCUMENTS

| | | | |
|---|---|---|---|
| 7,255,822 B2 | 8/2007 | Bledsoe et al. | |
| 7,338,696 B2 | 3/2008 | Rambaud et al. | |
| 7,540,932 B2 | 6/2009 | Rub et al. | |
| 7,553,435 B2 | 6/2009 | McCollum | |
| 7,722,112 B2 | 5/2010 | Erlich | |
| 7,722,122 B2 | 5/2010 | Mittelstadt | |
| 7,758,487 B2 | 7/2010 | Elsayed et al. | |
| 7,785,518 B2 | 8/2010 | Wirt et al. | |
| 7,814,658 B2 | 10/2010 | Akishev et al. | |
| 7,842,147 B2 | 11/2010 | Shen et al. | |
| 8,087,494 B2 | 1/2012 | Palumbo et al. | |
| 8,273,208 B2 | 9/2012 | Brinner | |
| 8,336,933 B2 | 12/2012 | Nagwanshi et al. | |
| 8,474,583 B2 | 7/2013 | Nagwanshi et al. | |
| 8,524,351 B2 | 9/2013 | Ross | |
| 8,584,433 B2 | 11/2013 | Masuda | |
| 8,663,523 B2 | 3/2014 | Bradford et al. | |
| 8,690,233 B2 | 4/2014 | Preisler et al. | |
| 8,726,613 B2 | 5/2014 | Rhee et al. | |
| 8,764,089 B2 | 7/2014 | Preisler et al. | |
| 8,770,344 B2 | 7/2014 | Borroni | |
| 8,795,465 B2 | 8/2014 | Preisler et al. | |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |
| 8,808,833 B2 | 8/2014 | Preisler et al. | |
| 8,808,834 B2 | 8/2014 | Preisler et al. | |
| 8,808,835 B2 | 8/2014 | Preisler et al. | |
| 8,834,985 B2 | 9/2014 | Preisler et al. | |
| 8,845,947 B2 | 9/2014 | Wirt et al. | |
| 8,852,711 B2 | 10/2014 | Preisler et al. | |
| 8,859,074 B2 | 10/2014 | Preisler et al. | |
| 8,883,285 B2 | 11/2014 | Preisler et al. | |
| 8,945,327 B2 | 2/2015 | Stamp et al. | |
| 8,995,138 B2 | 3/2015 | Preisler et al. | |
| 9,010,834 B2 | 4/2015 | Preisler et al. | |
| 9,126,537 B2 | 9/2015 | Preisler et al. | |
| 9,283,895 B2* | 3/2016 | Sumi | B32B 3/28 |
| 9,308,945 B2 | 4/2016 | Preisler et al. | |
| RE45,991 E | 5/2016 | Preisler et al. | |
| 9,346,375 B2 | 5/2016 | Preisler et al. | |
| 9,550,336 B2 | 1/2017 | Bradford | |
| 9,908,315 B2 | 3/2018 | Speer | |
| 10,239,566 B2 | 3/2019 | Bauer et al. | |
| 2001/0011832 A1 | 8/2001 | Erlich et al. | |
| 2002/0014302 A1 | 2/2002 | Fanucci et al. | |
| 2002/0098341 A1 | 7/2002 | Schiffer et al. | |
| 2002/0109377 A1 | 8/2002 | Erlich | |
| 2002/0176960 A1 | 11/2002 | Nadezhdin et al. | |
| 2003/0186029 A1 | 10/2003 | Ogawa et al. | |
| 2004/0055248 A1 | 3/2004 | Grillos | |
| 2004/0161586 A1* | 8/2004 | Cree | B29C 59/04 |
| | | | 428/137 |
| 2004/0217631 A1 | 11/2004 | Erlich | |
| 2005/0087899 A1* | 4/2005 | Coon | B29C 44/18 |
| | | | 264/46.4 |
| 2005/0123720 A1 | 6/2005 | Suzuki et al. | |
| 2005/0204561 A1 | 9/2005 | Kim | |
| 2005/0225118 A1 | 10/2005 | Oren | |
| 2005/0257893 A1 | 11/2005 | Rub et al. | |
| 2006/0028050 A1 | 2/2006 | Erlich | |
| 2006/0241542 A1* | 10/2006 | Gudnason | A61F 13/0283 |
| | | | 602/59 |
| 2007/0004813 A1 | 1/2007 | Shelby et al. | |
| 2007/0056687 A1 | 3/2007 | Brinner | |
| 2007/0196681 A1 | 8/2007 | Biggs et al. | |
| 2007/0256379 A1 | 11/2007 | Edwards | |
| 2008/0111393 A1 | 5/2008 | Ehrlich | |
| 2008/0116718 A1 | 5/2008 | Lewallen et al. | |
| 2009/0032992 A1* | 2/2009 | Fujita | B29D 7/01 |
| | | | 264/210.1 |
| 2009/0202785 A1 | 8/2009 | Meyer Zu Drewer et al. | |
| 2009/0206631 A1 | 8/2009 | Lewallen et al. | |
| 2009/0297763 A1 | 12/2009 | Ross | |
| 2009/0324905 A1 | 12/2009 | Welch et al. | |
| 2010/0227087 A1 | 9/2010 | Naldi | |
| 2011/0089183 A1 | 4/2011 | Gundelsheimer | |
| 2011/0095574 A1 | 4/2011 | Brown | |
| 2011/0135862 A1 | 6/2011 | Sumi et al. | |
| 2011/0250384 A1 | 10/2011 | Sumi et al. | |
| 2012/0003423 A1* | 1/2012 | Cree | A61F 13/512 |
| | | | 428/137 |
| 2012/0040135 A1 | 2/2012 | Werthen et al. | |
| 2012/0282436 A1* | 11/2012 | Coe | B29C 59/04 |
| | | | 264/156 |
| 2014/0044914 A1 | 2/2014 | Kurtz et al. | |
| 2014/0110878 A1* | 4/2014 | Suski | A21C 11/08 |
| | | | 264/153 |
| 2014/0127452 A1 | 5/2014 | Dietz et al. | |
| 2014/0178636 A1 | 6/2014 | Wu et al. | |
| 2014/0345795 A1 | 11/2014 | Speer | |
| 2014/0349077 A1 | 11/2014 | Sumi et al. | |
| 2015/0130220 A1 | 5/2015 | Preisler et al. | |
| 2015/0130221 A1 | 5/2015 | Preisler et al. | |
| 2015/0132532 A1 | 5/2015 | Preisler et al. | |
| 2015/0145276 A1 | 5/2015 | Preisler et al. | |
| 2015/0273810 A1 | 10/2015 | Carretta | |
| 2015/0306840 A1 | 10/2015 | Ferguson, Jr. | |
| 2016/0176149 A1 | 6/2016 | Manderfeld et al. | |

FOREIGN PATENT DOCUMENTS

| | | | | |
|---|---|---|---|---|
| JP | H0387461 A | 4/1991 | | |
| JP | 2003285397 A | 10/2003 | | |
| JP | 2005238622 A | 9/2005 | | |
| WO | 9014943 A1 | 12/1990 | | |
| WO | 9300845 A1 | 1/1993 | | |
| WO | 0024559 A1 | 5/2000 | | |
| WO | 0244493 A1 | 6/2002 | | |
| WO | WO-2004028782 A1 * | 4/2004 | | B65B 47/02 |
| WO | 2005077654 A1 | 8/2005 | | |
| WO | 2006128632 A1 | 12/2006 | | |
| WO | 2008141688 A2 | 11/2008 | | |
| WO | 2010050242 A1 | 5/2010 | | |
| WO | 2010069994 A2 | 6/2010 | | |

OTHER PUBLICATIONS

International Search Report and Written Opinion issued in corresponding PCT/US2018/015984 dated Apr. 19, 2018, 7 pages.
Non-Final Rejection dated Sep. 1, 2009, for U.S. Appl. No. 11/859,014, 8 pages; obtained from USPTO records, U.S. Pat. No. 9,908,315.
Non-Final Rejection dated Oct. 1, 2013, for U.S. Appl. No. 13/204,762, 18 pages; obtained from USPTO records, U.S. Pat. No. 9,908,315.
Final Rejection dated Apr. 9, 2014, for U.S. Appl. No. 13/204,762, 17 pages; obtained from USPTO records, U.S. Pat. No. 9,908,315.
IMPI Second Office Action dated Oct. 27, 2015, 4 pages, for corresponding Mexican Patent Application MX/a/2011/008411; obtained from USPTO records, U.S. Pat. No. 9,908,315.
Goodrich Riquelme Asociados letter dated Dec. 29, 2015 with English translation of Oct. 27, 2015 Office Action, 4 pages, for corresponding Mexican Patent Application MX/a/2011/008411; obtained from USPTO records, U.S. Pat. No. 9,908,315.

* cited by examiner

COMPOSITE PANEL HAVING PERFORATED FOAM CORE AND METHOD OF MAKING THE SAME

CROSS REFERENCE TO RELATED APPLICATIONS

This application is a continuation of U.S. patent application Ser. No. 14/454,097 filed Aug. 7, 2014, now issued as U.S. Pat. No. 9,908,315 which is a divisional of U.S. patent application Ser. No. 13/204,762 filed Aug. 8, 2011, now abandoned, which claims priority to U.S. Provisional Patent Application Ser. No. 61/372,259 entitled "COMPOSITE PANEL HAVING PERFORATED FOAM CORE" which was filed on Aug. 10, 2010.

FIELD OF THE INVENTION

The present invention relates generally to a composite panel for a storage container, such as a truck trailer, for example. In particular, the present invention relates to a perforated foam core of the composite panel.

BACKGROUND

Many storage containers, such as large truck trailers, for example, include sidewalls made from composite panels. Illustratively, such composite panels may include a plastic core member sandwiched between thin metal skins. The composite panels are thereafter joined together to create the trailer sidewall. For example, DURAPLATE® composite panels provided by Wabash National Corporation of Lafayette, Ind. are constructed of a high-density polyethylene plastic core bonded between two high-strength steel skins.

SUMMARY

The present invention may comprise one or more of the features recited in the attached claims, and/or one or more of the following features and combinations thereof.

According to one aspect of the present disclosure, a method of forming a composite panel in-line is disclosed. The method includes the steps of forming a hot thermal plastic sheet of material and providing the hot thermal plastic sheet of material to a punch having punch members extending outwardly therefrom. The hot thermal plastic sheet of material is advanced through the punch in order to form apertures through the hot thermal plastic sheet of material such that each aperture extends from an outer surface of the hot thermal plastic sheet of material to an inner surface of the hot thermal plastic sheet of material. An outer metal sheet and an inner metal sheet, respectively, are coupled to opposing sides of the hot thermal plastic sheet of material.

According to a further aspect of the disclosure, a method of continuously forming a composite panel along a single production line is disclosed. The method includes the steps of forming a hot thermal plastic sheet of material, providing the hot thermal plastic sheet of material to a punch, displacing slugs of material from the hot thermal plastic sheet of material via punch members protruding outwardly from the punch, and coupling an outer metal sheet and an inner metal sheet to opposite surfaces of the hot thermal plastic sheet of material.

According to an additional aspect of the disclosure, a method of continuously forming a composite panel along a single production line is disclosed. The method includes the steps of continuously extruding heated, foamed thermal plastic pellets to form a hot thermal plastic sheet of material and providing a transversing punch having an upper platform with punches extending therefrom and a lower platform coupled to the upper platform. The hot thermal plastic sheet of material is provided through the transversing punch and apertures are formed through the hot thermal plastic sheet of material via the punches of the transversing punch. An outer sheet and an inner sheet are continuously laminated to opposite surfaces of the hot thermal plastic sheet of material.

According to yet another aspect of the present disclosure, a method of forming a composite panel configured for use in a sidewall of a trailer includes forming an uncooled thermal plastic sheet of material and advancing the uncooled thermal plastic sheet of material through a transversing punch. Advancing the uncooled thermal plastic sheet of material through the transversing punch forms apertures through the uncooled thermal plastic sheet of material such that each aperture extends from an outer surface of the thermal plastic sheet of material to an inner surface of the thermal plastic sheet of material. The method further includes cooling the transversing punch and coupling an outer metal sheet and an inner metal sheet to the respective outer surface and the inner surface of the uncooled thermal plastic sheet of material.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers or storage containers.

Figure 1:
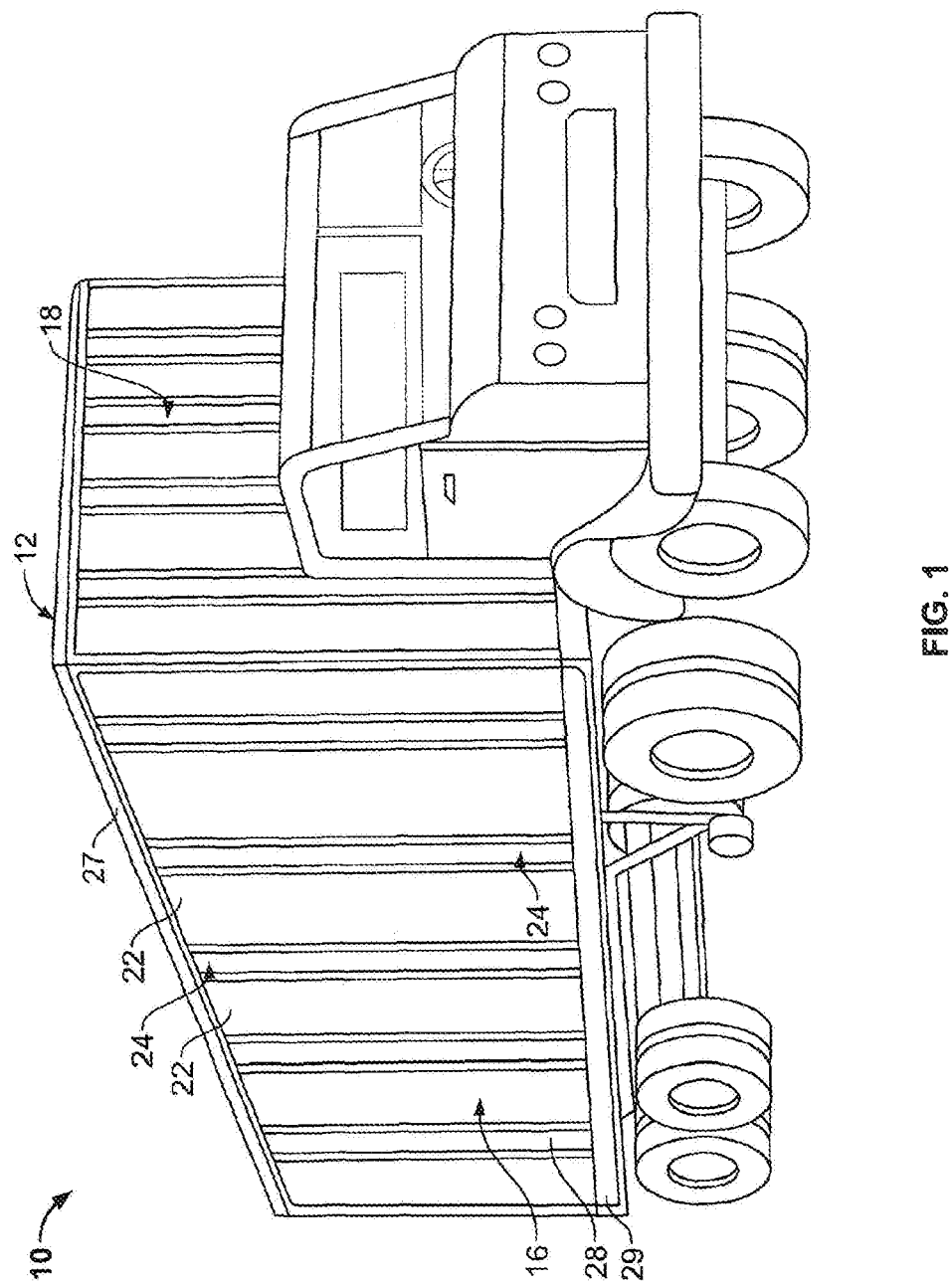
FIG. 1 is a perspective view of a trailer having side-walls including a plurality of composite panels.
Figure 2:
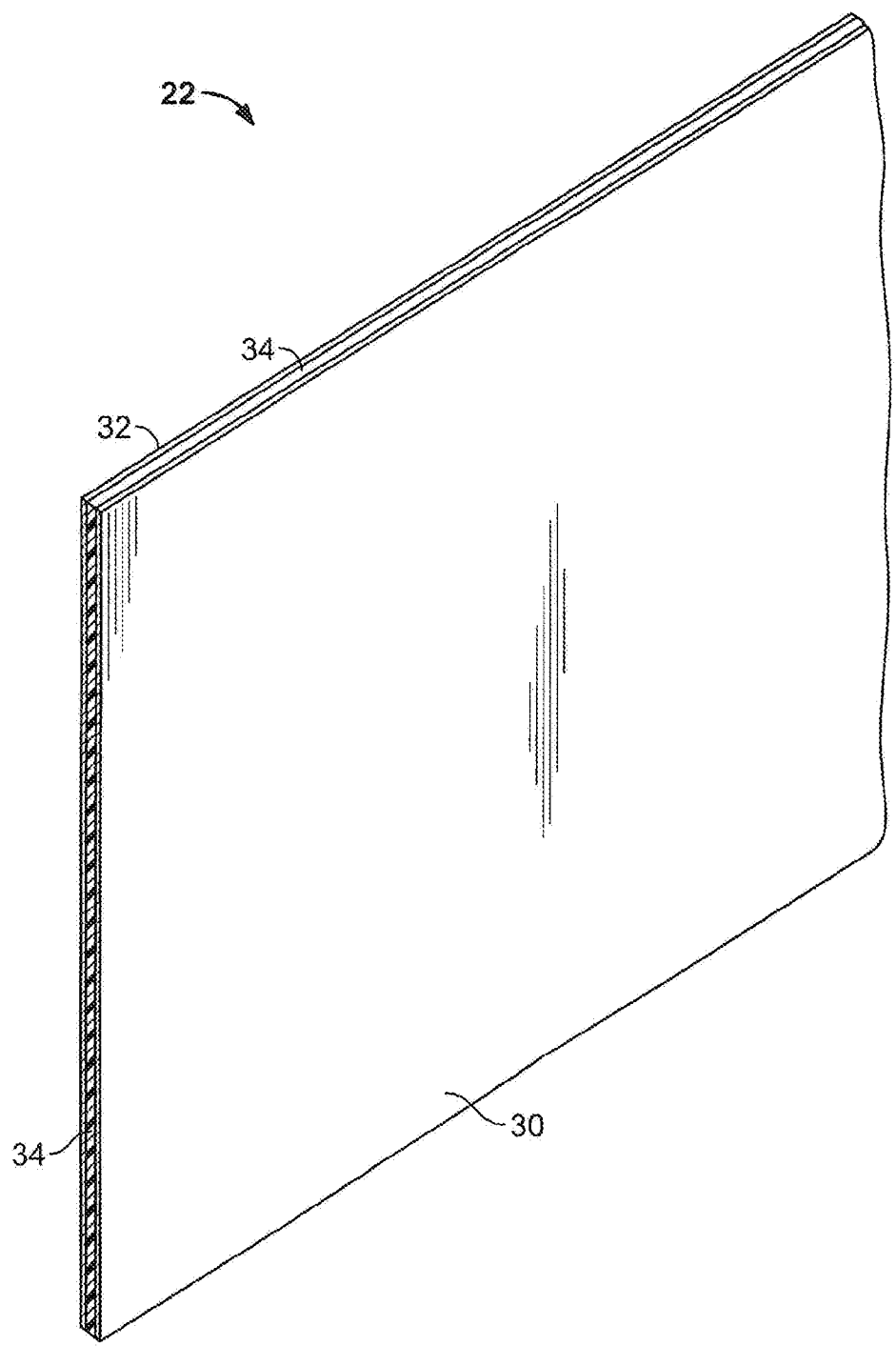
FIG. 2 is a perspective view of a portion of one of the composite panels of FIG. 1 showing two outer metal skins and an inner foam core of the panel.
Figure 3:
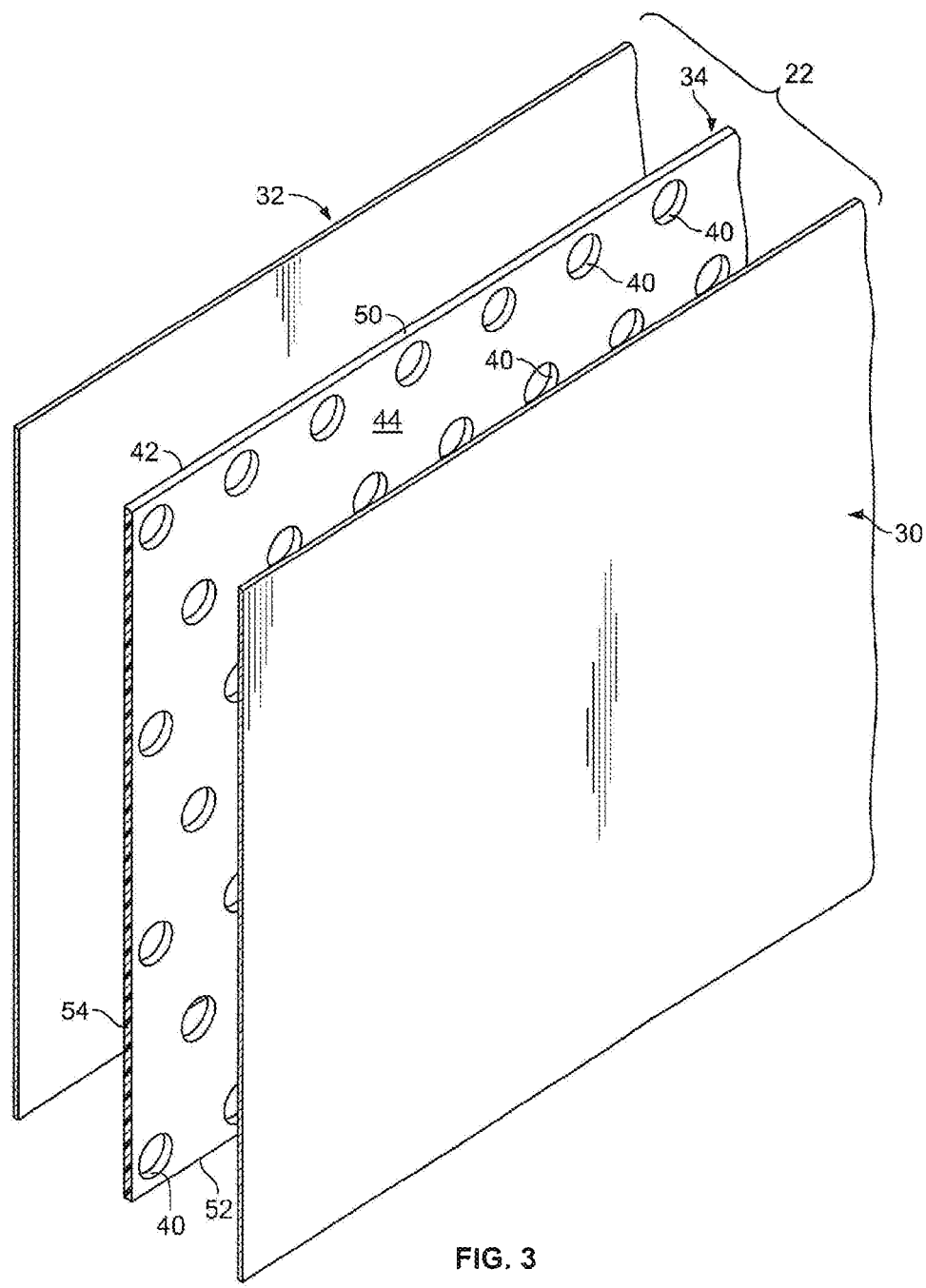
FIG. 3 is a perspective, exploded view of the composite panel of FIG. 2 showing the foam core including a plurality of holes formed therethrough.

Looking first to FIGS. 1-3, a truck trailer 10 includes a roof assembly 12 coupled to opposite sidewalls 16, a front end wall assembly 18, and a rear end wall assembly (not shown) including an overhead door. Alternatively, the rear end wall assembly may include two rear doors mounted in a conventional manner such that the doors are is hingedly coupled to and swing relative to a rear frame between opened and closed positions. Illustratively, the trailer 10 also includes a floor assembly (not shown) spaced apart from the roof assembly 12. Further illustratively, the trailer 10 is connected to a tractor 20 by conventional means, such as a fifth wheel, for example.

Illustratively, each sidewall 16 and the front end wall 18 of the trailer 10 are made from a plurality of composite panels 22. The composite panels 22 may be coupled to each other using a number of different fasteners and/or joint configurations. Illustratively, the composite panels 22 are coupled to each other via joint configurations 24 including a logistics plate (not shown) and a splicing plate 28. Such joint configurations are described in greater detail in U.S. Pat. No. 7,069,702, the entirety of which is hereby incorporated by reference herein. Of course, it should be understood that other joint configurations and other fasteners (including rivets, screws, bolts, nails, welding, adhesives, and the like) may be used to couple adjacent composite panels 22 together as well.

Illustratively, each composite panel 22 is generally rectangular having a height greater than its width. The composite panels 22 may be relatively equal in size, or, alternatively, the width and/or thickness of each composite panel 22 may vary. When the composite panels 22 are used in the construction of the sidewalls 16 and the front wall assembly 18, each composite panel 22 is connected to the floor assembly and extends upwardly therefrom such that each panel 22 is attached to upper and lower rails 27, 29 of the trailer 10 by suitable joining members, such as bolts or rivets, for example. When the composite panels 22 are used in the construction of the rear doors, the outer composite panels are connected to the respective sidewalls 16 of the trailer 10 by hinges. When closed, the doors extend upwardly from the floor assembly. Although the trailer 10 includes a plurality of composite panels 22 coupled to each other to form a single sidewall 16, it is within the scope of this disclosure to provide a trailer having a front end wall and/or sidewalls which are formed from one continuous composite panel.

Looking now to FIG. 2, each composite panel 22 includes a inner metal sheet 30, an outer metal sheet 32, and a foamed thermal plastic core member 34 positioned between the inner and outer sheets 30, 32. Illustratively, as is described in greater detail below, the inner and outer metal sheets 30, 32 are bonded to the core member 34, by a thin adhesive layer (not shown). In particular, the sheets 30, 32, are bonded to the foamed thermal plastic core member 34 by a suitable flexible adhesive bonding film such as, for example, modified poly-ethylene. Of course, it should be understood that any suitable adhesive may be used as well. When fully assembled, the outer sheets 32 of each panel 20 cooperate to form an outer surface of the sidewalls 16 of the trailer 10 while the inner sheets 30 of each panel 20 cooperate to form an inner surface of the sidewalls 16 of the trailer 10.

The metal sheets 30, 32 of each composite panel 20 of the present disclosure may be formed of aluminum or full hard, high strength, high tension, galvanized steel. However, other metals or metal alloys may be used as well. Illustratively, each sheet 30, 32 has a thickness of greater than nine-teen thousandths of an inch. However, sheets 30, 32 having lesser thicknesses may be used as well.

The core member 34 is formed from a foamed thermal plastic, preferably foamed high density polyethylene (HDPE) or high density polyproplylene. Core weight reduction is often achieved by the addition of a gas during the extrusion process in order to produce a foamed thermal plastic, such as the core member 34. This gas, which is typically carbon dioxide, can be physically injected or liberated from chemical additives, creates a foamed core. As such, the core member 34 includes a plurality of air bubbles interspersed with the thermal plastic material. This foaming of the core member 34 lowers the density of the thermal plastic and improves the strength to weight ratio thereof. The foaming of the core member 34 also reduces the weight of the composite panel 22 as compared to a composite panel having a solid, non-foamed core member. Further, the foamed core member 34 uses less plastic resin versus a solid core member. How-ever, the extent to which the density and the weight reduction may be achieved using this method may be limited by physical process dynamics and needs to maintain acceptable core surface cosmetic appearance and surface area available for effective bonding of the metal sheets to the core.

While the illustrative core member 34 is formed from a foamed HDPE, the core member 34 may alternatively be made from foamed low density thermal plastic, such as foamed low density polyethylene or low density polypropylene. Low density thermal plastic will foam and produce a resilient core member as well. Further, it is within the scope of this disclosure for the core member 34 to be formed from a non-foamed high or low density thermal plastic as well.

The core member 34 is generally resilient and is able to flex a certain degree without breaking. Illustratively, the core member 34 is approximately one half of an inch thick or less. However, the core member 34 may be made to define any suitable or desired thickness.

Figure 4:
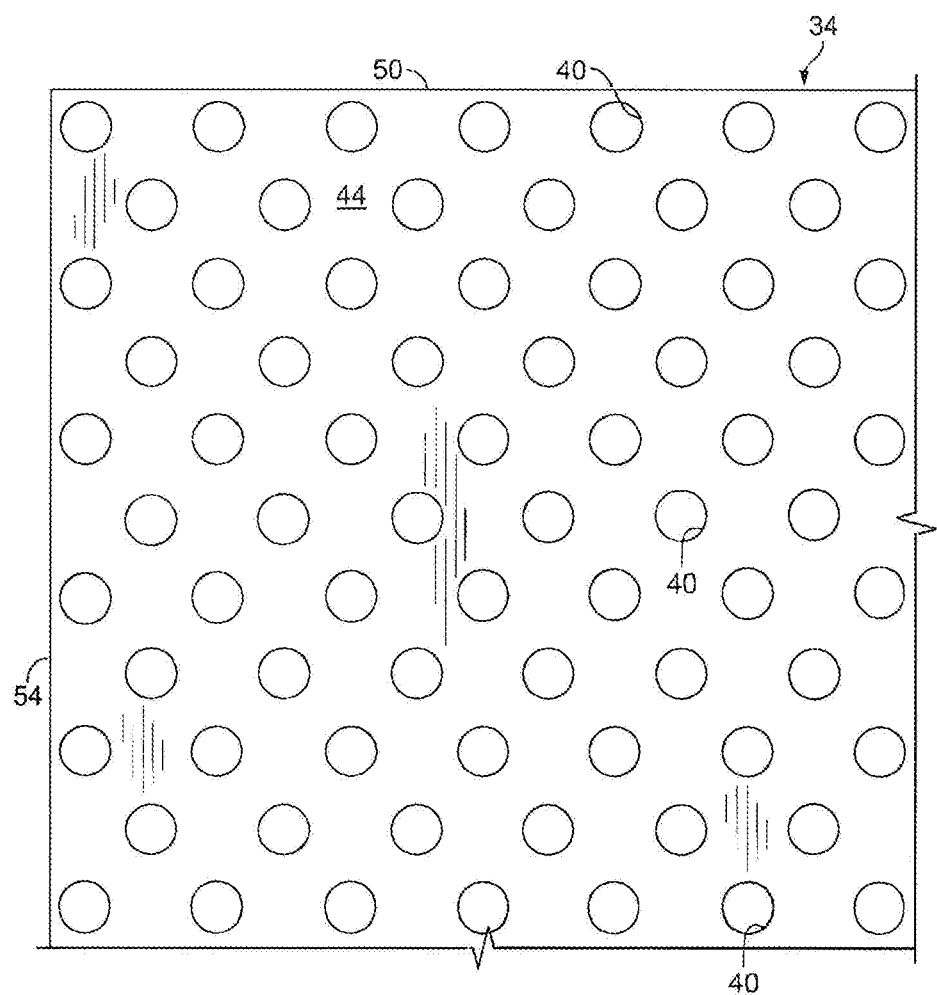
FIG. 4 is a planar view of the foam core of FIG. 3.

In order to further reduce the density-to-weight ratio beyond that which is achieved by the foaming process (discussed in greater detail below), holes, or apertures 40, are formed into the core member 34, as shown in FIG. 3. These apertures 40 each penetrate the full thickness of the core member 34. In other words, each hole 40 extends from an outer surface 42 of the core member 34 to an inner surface 44 of the foamed core member 34. Illustratively, as shown in FIGS. 3 and 4, the core member 34 includes a plurality of apertures 40 which are generally evenly spaced throughout the core member 34. Further illustratively, the plurality of apertures 40 are arranged in alternating rows of apertures 40 to create an array of apertures of the core member 34. Further illustratively, each aperture 40 is circular in shape and has a diameter in the range of approximately ¼ inch to ½ inch.

Illustratively, the apertures 40 shown in FIG. 4 do not open into either the top, bottom or side edges 50, 52, 54 of the core member 34. In other words, the top, bottom, and side edges 50, 52, 54 of the core member are generally solid in that no formed or manufactured apertures are located therein. Specifically, no apertures are formed in the outer edges 50, 52, 54 of the foam core member 34 by a punch or a different type of tool during the manufacturing process. As such, the inner and outer sheets 30, 32 of the composite panel 22 are continuously coupled to the respective inner and outer surfaces 42, 44 of the core member 34 along the top, bottom, and side edges 50, 52, 54 thereof. However, it should be understood that the core member 34 may include apertures 40 which are located at, or open up into, one or more of the top, bottom, and/or side edges 50, 52, 54 of the core member 34.

Figure 11:
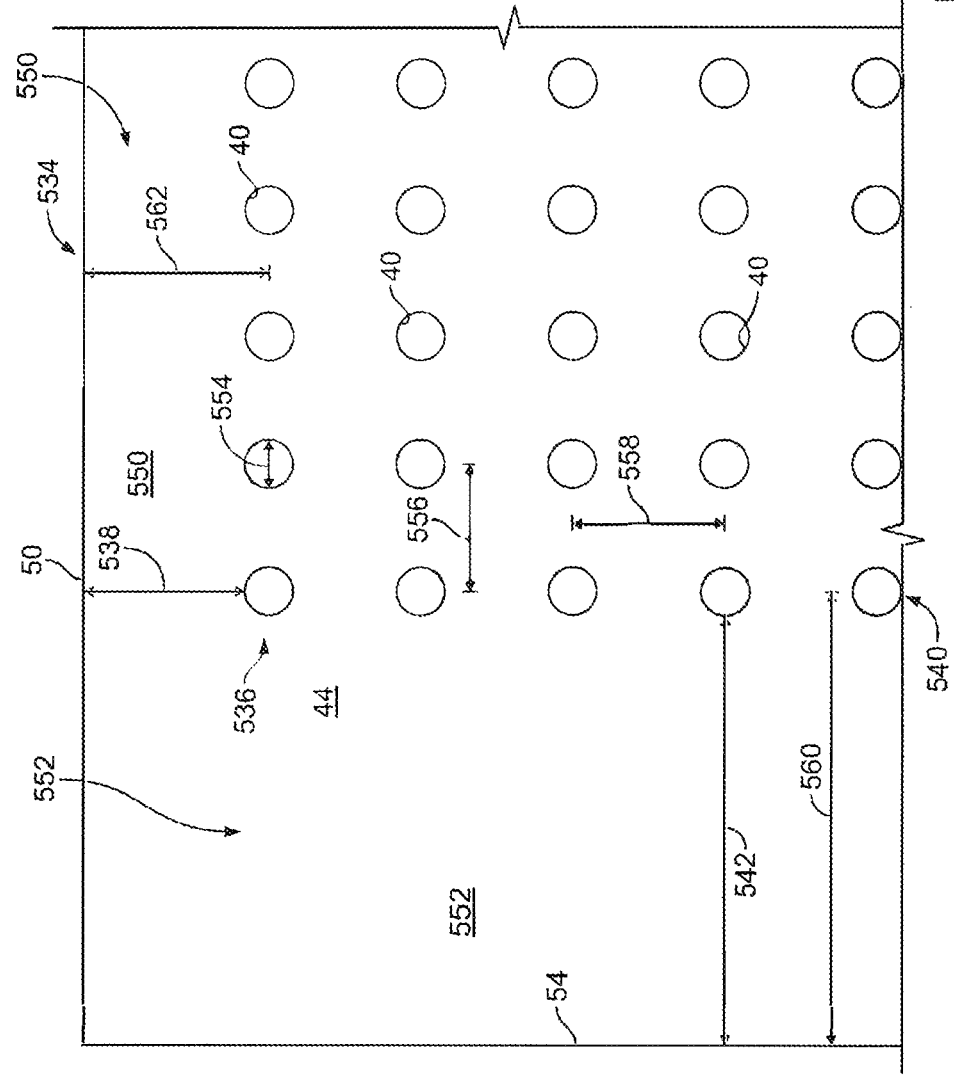
FIG. 11 is a planar view of an alternative foam core.

It should be understood that while the particular pattern of apertures 40 of the illustrative core member 34 is shown in FIGS. 3 and 4, apertures 40 may be arranged in any suitable pattern on the core member 34. Further, the apertures 40 may be located on only one side (e.g., right, left, top, or bottom) or on only a portion of the core member 34. In other words, the apertures 40 need not be positioned to cover generally the entire surface area of the core member 34 from the top of the core member 34 to bottom of the core member 34 and from one side of the core member 34 to the other side of the core member 34. For example, while generally the entire core member 34 is perforated to include the apertures 40 positioned throughout, it should be understood that the apertures may be positioned in other suitable configurations that do not span the width and/or height of the core member 34. However, generally none of the apertures 40 disclosed herein includes a length or a width which is equal to the respective length and width of the core member 34. In other words, none of the core members disclosed herein include a void which extend from one of the top, bottom and/or side edges of the core member 34 to any other of the top, bottom, or side edges of the core member 34. Accordingly, a length and a width (or a diameter, for those apertures which are circular in shape) of each aperture 40 is less than a respective length and width of the core member 34 in which it is formed. In particular, an alternative core member 534 is shown in FIG. 11 and includes a pattern of apertures 40 that are spaced-apart from the top, bottom, and side edges 50, 52, 54 of the core member 534. Specifically, a top-most, horizontal row 536 of apertures 40 is spaced-apart a distance 538 from the top edge 50 of the core member 534. Further, a left-most, vertical row 540 of apertures 40 (as viewed from above, as shown in FIG. 11) is spaced-apart a distance 542 from the left side edge 54 of the core member 534. Illustratively, a bottom-most, horizontal row (not shown) of apertures 40 of the core member 534 is also spaced-apart from the bottom edge (not shown) of the corememember534 while a right-most, vertical row (not shown) of apertures 40 of the core member 534 is also spaced-apart from the right-most edge (not shown) of the core member 534.

Illustratively, the distances 538 and 542 may be equal to each other or may be different from each other. Further illustratively, the core member 534, or any core member disclosed herein, may include any combination of top-most, left and right side-most, and bottom-most rows of apertures 40 which are spaced any other suitable distance away from the edges 50, 52, 54 of the core member 534. In particular, such apertures may be spaced away from the edges 50, 52, 54 in order to provide a suitable space for a fastener to be received through an aperture-free area or portion 550, 552 of the core member 534. In other words, the distances may be greater than or less than that which is shown in FIG. 11. Further, the core member 534 may include any combination of top-most, left and right side-most, and bottom-most rows of apertures which are not spaced a suitable distance apart from the respective top, side, and bottom edges 50, 52. 54 of the core member 534 in order to be able to receive a fastener through an aperture-free portion of the core member 534.

Illustratively, a diameter 554 of each aperture 40 is approximately 0.250 inches. However, an aperture of any suitable size may be provided within the composite member 534. Further, a distance 558 between a centerpoint of adjacent, vertical rows of apertures 40 is approximately 0.625 inch. Similarly, a distance 556 between a centerpoint of adjacent horizontal rows of apertures 40 is also approximately 0.625 inch. However, any suitable distance may be provided between apertures of adjacent horizontal rows or adjacent vertical rows. Further illustratively, a distance 560 between the left edge 54 of the core member 534 and the center of the left-most row 540 of apertures 40 of the core member 534 may be approximately 0.50-6.00 inches while a distance 562 between the upper edge 50 of the core member 534 and the center of upper-most row 536 of apertures 40 of the core member 534 may also be approximately 0.50-6.00 inches. Preferably, the distance 560 of the core member 534 is approximately 6.00 inches while the distance 562 of the core member 534 is approximately 2.00 inches. Illustratively, it should be understood that the core member 534 is illustrative in nature and that other core members having apertures of different shapes and sizes may be provided. Further, core members having different distances between vertical and/or horizontal rows of apertures may be provided and core members having different distances between outer edges and the apertures may be provided as well. Finally, it need not be required that such distances are consistent throughout a single core member.

Illustratively, the spaced-apart rows 536, 540 of apertures 40 from the respective top and sides 50, 54 of the core member 534 provide a top portion 550 and a side portion 552 of the core member 534 that is free from, or that does not include, any apertures 40. The top portion 550 of the core member 534 is positioned between the top edge 50 of the core member 534 and the top-most, horizontal row 536 of apertures 40 of the core member 534. The side portion 552 of the core member 534 is positioned between the left-most, side edge 54 of the core member 534 and the left-most, vertical row 540 of the apertures 40 of the core member 534.

As discussed above, the top portion 550 and the side portion 552 of the core member 534 provide areas free from apertures 40 that may be used to secure fasteners therethrough in order to couple one core member 534 to another core member 534 and/or to couple the core member 534 to another object. In particular, rivets, for example, may be punched through the aperture-free portions 550,552 of the core member 534 in order to couple the core member 534, or the entire composite panel to which the core member 534 belongs, to another object, including, but not limited to adjacent core members 534 and/or adjacent composite panels. Further, fasteners, may also be punched through the aperture-free top and bottom portions of the composite panels to which the core member 534 belongs in order to couple top and bottom rails (not shown) of a trailer to the composite panels. In particular, after the composite panel is formed and the inner and outer sheets 30, 32 are attached to the core member 534 including the apertures 40 and the aperture-free portions 550, 552, rivet-receiving holes may be punched through the formed composite panel (i.e., the inner sheet 30, the aperture-free portions 550, 552 of the core member 534, and the outer sheet 32) such that rivets may then be received through such rivet-receiving holes.

Figure 12:
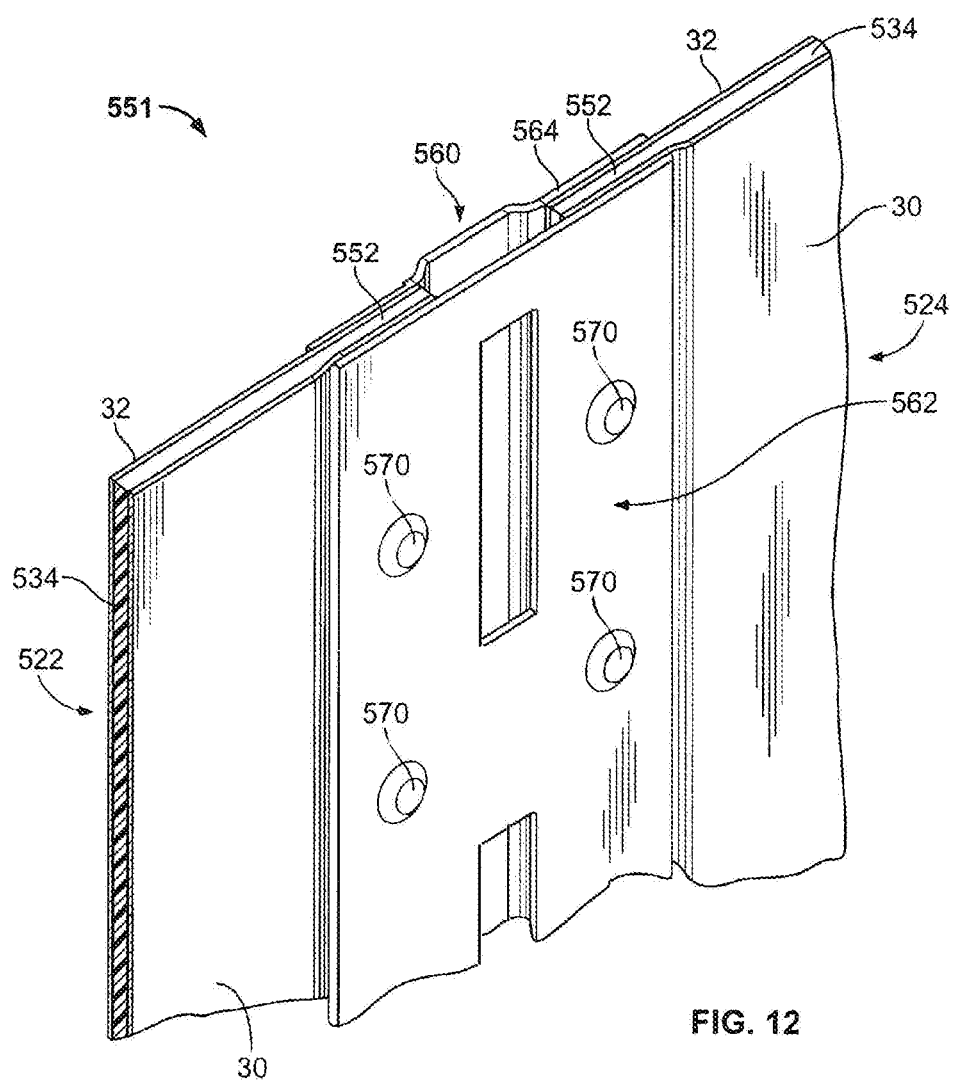
FIG. 12 is a perspective view of a portion of two adjacent composite panels of a sidewall of a trailer which are coupled to each other via a coupling joint and which include the alternative foam core of FIG. 11.

Looking to FIG. 12, for example, a portion of a sidewall 551 of a trailer includes a first composite panel 522 having the core member 534, and an inner metal sheet 30 and an outer metal sheet 32 each coupled to the core member 534 via the use of an adhesive. Illustratively, the sidewall 551 includes a second composite panel 524 similarly having the core member 534, and an inner metal sheet 30 and an outer metal 32 each coupled to the core member 534 via the use of an adhesive. The first and second composite panels 522, 524 are adjacent to and spaced-apart from each other in a side-by-side manner. A wall panel joint 560 including a logistics member 562 and a splicing member 564 is provided to couple the adjacent composite panels 522, 524 together. Illustratively, the rivets 570 used to couple the wall panel joint 560 to the composite panels 522, 524 are positioned within the side, aperture-free portion 552 of each core member 534 of the panels 522, 524. The same and/or similar wall panel joint is discussed in greater detail in U.S. Pat. No. 6,220,651, the entirety of which is hereby incorporated by reference herein. Illustratively, the wall panel joints discussed in the '651 patent may be used to join together one or more adjacent composite panels disclosed herein.

Figure 13:
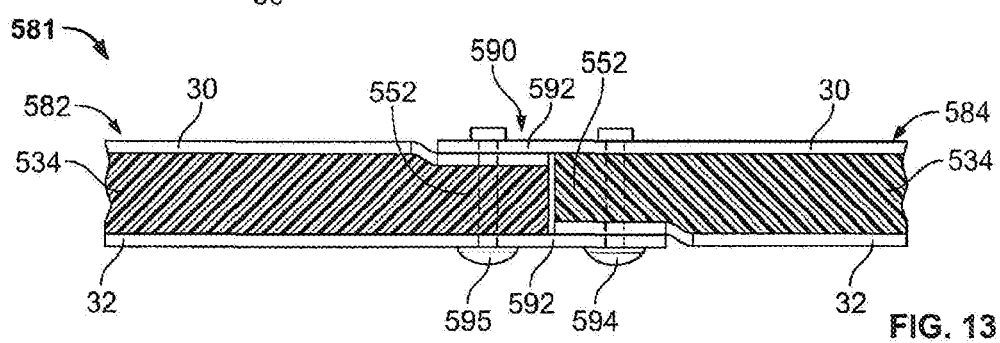
FIG. 13 is a sectional view of a portion of two adjacent composite panels of a sidewall of a trailer which are coupled to each other via a shiplap joint and which include the alternative foam core of FIG. 11.

While the composite panels 522, 524 of FIG. 12 are joined together by the wall panel joint 560 in order to form at least a portion of a sidewall of a trailer, it should be under-stood that other wall panel may be used as well. For example, as shown in FIG. 13, a portion of an alternative sidewall 581 includes a first composite panel 582 and a second composite panel 584 each including the core member 534, an inner metal sheet 30, and an outer metal sheet 32. The composite panels 582, 584 are joined together by a joint 590. In particular, the joint 590 is a shiplap joint. As shown in FIG. 13, each composite panel 582, 584 includes an overlapping skin member 592 for overlapping a portion of one of the respective metal sheets 30, 32. Preferably, this overlapping skin member 592 is integrally formed as part of the respective metal sheet 30, 32 of each composite panel 582, 584. However, it is envisioned that the overlapping skin member 590 may be a separate member attached to the composite panels 582, 584 by suitable means. Illustratively, the overlapping skin member 590 of each panel 582, 584 is provided for overlapping a portion of the respective inner and outer sheets 30, 32 of the other, adjacent panel 582, 584. As shown in FIG. 13, a side end portion of the respective sheets 30, 32 of the panels 582, 584 are coined or stepped by suitable means so as to form a stepped end portion. Because the stepped end portion has been stepped a distance which is equal to the thickness of the overlapping skin member 590, the surface formed by the adjacent panels 582, 584 is substantially flush. This prevents the overlapping skin members 592 from being snagged by an outside object. A conventional rivet member 594 is then engaged through aligned rivet-receiving holes provided through the overlapping skin member 592 of the first composite panel 582 and the stepped end portion of the second composite panel 584. A second conventional rivet member 595 is engaged through aligned rivet-receiving holes provided through the stepped end portion of the first composite panel 582 and the overlapping skin member 592 of the second composite panel 584. Illustratively, the rivets 594,595 used to couple the composite panels 582, 584 together are positioned within the side, aperture-free portion 552 of each core member 534 of the panels 582,584. In other words, the stepped end portions of the first and second composite panels 582, 584 include the aperture-free portions 552 of the core member 534. The same and/or similar wall panel joint is discussed in greater detail in U.S. Pat. No. 5,938,274, the entirety of which is hereby incorporated by reference herein. Illustratively, the wall panel joints discussed in the '274 patent may be used to join together one or more adjacent composite panels dis-closed herein.

It should be understood that the aperture-free portions 550, 552 of the foam core 534 of the composite panels disclosed herein are free of apertures prior to the process of being joined to adjacent composite panels. The aperture-free portions 550, 552 provide suitable aperture-free areas or portions of the composite panels for having a rivet-receiving hole formed therethrough. In other words, the apertures 40 are non-rivet or non-fastener-receiving apertures that are different from the rivet-receiving holes formed through the already-formed composite panels. These rivet-receiving holes are formed through the entire thickness of the composite panels including the inner and outer sheets 30, 32 and are not only formed through the foam core contrary to the apertures 40 disclosed herein which are formed only through the foam core of a composite panel. In other words, the aperture-free portions define an area of the foam core of a composite panel which does not include any apertures that are formed only through the foam core of the composite panel. Accordingly, the aperture-free portions may later have rivet-receiving holes formed therein. Thus, aperture-free portions 550, 552 of the composite panel may include rivet-receiving holes which may later be formed through the composite panel in order to join two adjacent composite panels together.

Illustratively, the pattern of the apertures 40 of the core member 534 is different than the pattern of the apertures 40 of the core member 34 shown in FIGS. 3 and 4. In particular, the pattern of the apertures 534 of the core member 534 includes vertical and horizontal rows of apertures 40 that are all aligned with each other. In other words, every vertical row of apertures 40 of the core member 534 is aligned with every adjacent vertical row of apertures 40 of the core member 534. Further, every horizontal row of apertures 40 of the core member 534 is aligned with every adjacent horizontal row of apertures 40 of the core member 534. However, the pattern of the apertures 40 of the core member 34 includes staggered, or offset, vertical and horizontal rows of apertures 40, as shown in FIG. 4, such that every other vertical row of apertures 40 of the core member 34 is aligned with every other (and not every adjacent) vertical row of apertures 40 of the core member 34 and every horizontal row of apertures 40 of the core member 34 is aligned with every other (and not every adjacent) horizontal row of apertures 40 of the core member 34. Illustratively, while the specific patterns of apertures 40 are shown in the core member 34 and the core member 534, it should be understood that a core member may be provided which includes any suitable pattern of apertures formed therethrough including any number of aligned and/or misaligned horizontal and vertical rows of apertures. Further, a random array of apertures having not particular pattern may be provided as well.

While the particular apertures 40 of each of the core members 34, 534 are circular in shape, it should be understood that the members 34, 534 may include apertures 40 of any shape, such as square, rectangular, triangular, oval, etc. Further, it should be understood that the core members 34, 534 may each include apertures of any suitable size having any suitable dimensions. Finally, while the core members 34, 534 each include an array of apertures 40 which are all of the same shape and size, it should be understood that the core members 34, 534 may include apertures of varying dimension, size, and/or shape. In other words, while the apertures 40 of the illustrative core members 34, 534 are all of uniform shape and size, the core members 34, 534 may each include any number of apertures having different sizes and/or shapes. In other words, the spacing, dimension, and geometry of the apertures of the core members 34, 534 may be different and optimized according to specific production process and performance specifications. Finally, while the apertures 40 of each of the core members 34, 534 are shown to be spaced a particular distance apart from each other that is generally uniform, it should be understood that the core members 34, 534 may each include apertures which are spaced further or closer apart than that which is shown and may also include apertures which are spaced a non-uniform distance from adjacent apertures.

Figure 5:
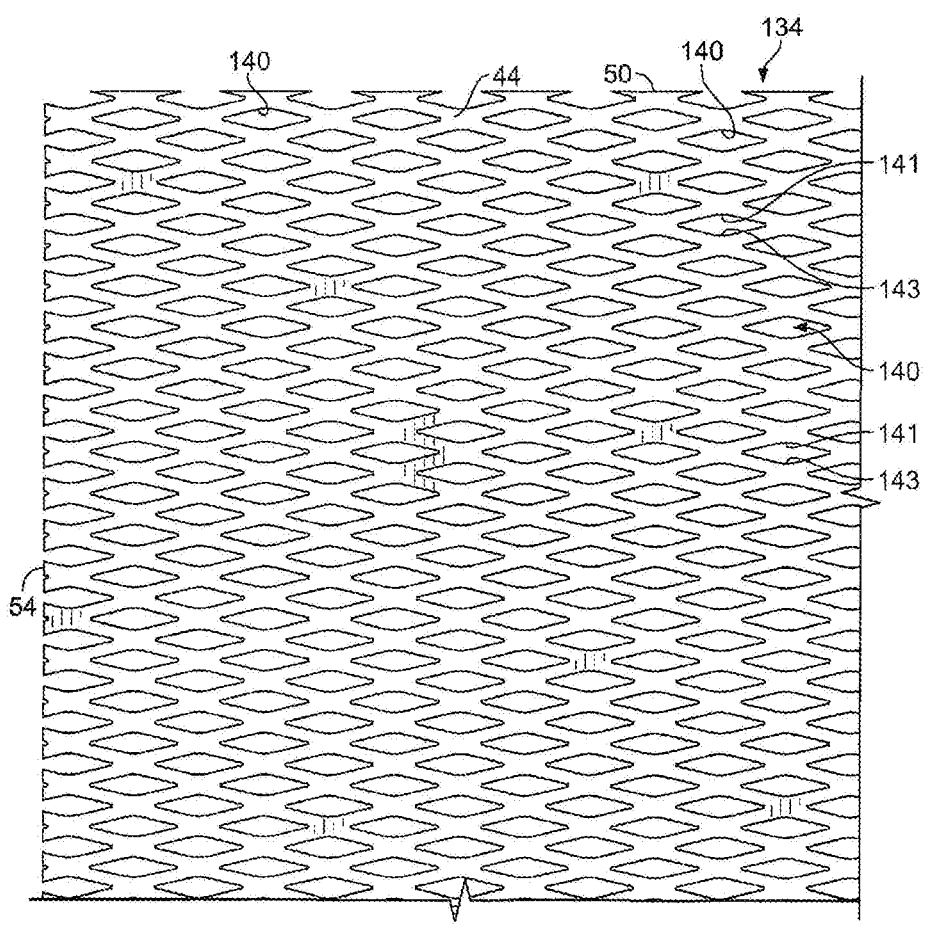
FIG. 5 is a planar view of an alternative foam core.

Looking to FIG. 5, for example, an alternative core member 134 is similar to the core members 34, 534. As such, like reference numerals are used to denote like components. Rather than the circular-shaped apertures 40 of the core members 34, 534, the core member 134 includes a plurality of generally diamond-shaped apertures 140. Illustratively, the diamond-shaped apertures 140 are approximately ¼ inch to ¾ inch wide and ½ inch to ¾ inch tall. However, the apertures 140 may have any suitable height and/or width. As discussed above in regard to the apertures 40, the apertures 140 extend through the entire thickness of the core member 134 from the outside surface 42 to the inside surface 44 of the core member 134.

Figure 6:
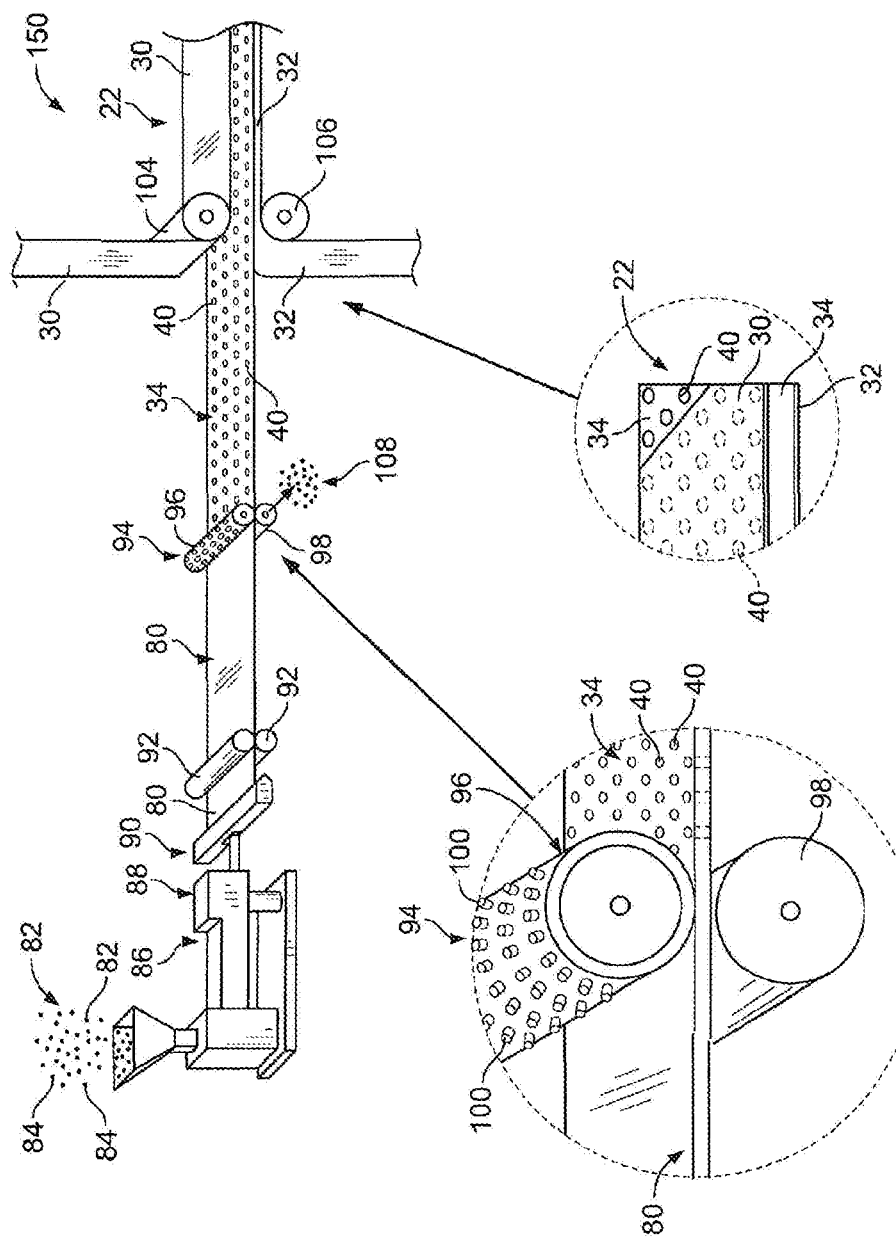
FIG. 6 is a schematic of a first method of making the composite panel FIG. 2.

Looking now to FIG. 6, an illustrative process or method 150 for making the composite panel 22 is schematically illustrated. Illustratively, a foamed core sheet 80 is first made by mixing foaming beads or pellets 82 with thermal plastic resin beads or pellets 84. These pellets 82, 84 are mixed in a mixing chamber 86 using an auger (not shown). The foaming pellets 82 have a gas therein, such as carbon dioxide or nitrogen, for example. The mixed pellets 82, 84 are subjected to heat in a hot die chamber 88 and the foaming pellets 82 activate and produce carbon dioxide or nitrogen to foam the mixture. The mixture is then extruded into a layer by an extruder 90 to form the foamed core 80. Illustratively, the foamed core sheet 80 is approximately 350° F. upon leaving the extruder 90. It should be understood that other methods of foaming the core member may be provided such as by injecting nitrogen into a heating chamber in which the thermal plastic resin pellets are being heated and are in a molten state (without the use of the foaming pellets being mixed there-with) and thereafter extruding the foamed core material onto a core member, or by using both the foaming pellets and the direct injection of nitrogen gas into a heating chamber in which both the thermal plastic resin pellets and the foaming pellets are being heated. Making a foamed core, such as the foamed core 80, is described in greater detail in U.S. Application Publication No. 2001/0011832, the entirety of which is hereby incorporated by reference herein. As noted above, while the method 150 of making the composite panel 22 includes making the foamed core sheet 80, it should be under-stood that the composite panel 22 may include a non-foamed core sheet as well.

Once the foamed core sheet 80 is formed, a first set of rollers 92 advances the foamed core 80 to a rotary die cutter 94 including an upper roller punch 96 and a lower roller 98. Illustratively, the rollers 92 are chilled rollers in order to cool the hot, extruded foamed core sheet 80. Further illustratively, the upper die roller punch 96 maybe an engraved steel cylinder on a roll-fed press. As shown in FIG. 6, the upper die roller 96 includes roller mounted hollow punches, or protrusions, 100 having a circular cross-section. These protrusions 100 operate to pierce the foamed core sheet 80 as it is advanced between the upper die roller 94 and the lower roller 96. The punches, or protrusions 100, react against the bottom roller 98 on the opposite side of the foamed core sheet 80. The protrusions 100 illustratively form the apertures 40 into the foamed core sheet 80 in order to produce the core member 34.

During the die cutting process, slugs of material 102 displaced from the core sheet 80 are produced. Illustratively, such slugs of material 102 may be extracted from the bottom roller 98, recycled, and reused to make additional core sheets or other devices including foamed components as well.

Once the core member 34, including the apertures 40, is formed, the core member 34 is advanced through a set of upper and lower heated laminating rollers 104, 106 where the inner and outer sheets 30, 32 are laminated to each respective inner and outer surface 42, 44 of the core member 34. Illustratively, a layer of flexible adhesive (not shown) may be applied to the inner surface of each of the sheets 30, 32 prior to laminating the sheets 30, 32 to the core member 34. Alternatively, the layer of flexible adhesive may be applied directly to the opposite surfaces 42, 44 of the core member 34. Further alternatively, the opposite surfaces 42, 44 of the core member 34 may be treated with a spray adhesive to create an adhesive bonding layer on the opposite surfaces 42, 44 such that the metal sheets 30, 32 may be directly bonded thereto. Regard-less of the type of adhesive used or the method by which the adhesive is applied, the inner and outer metal sheets 30, 32 are adhered to the core member 34 by the adhesive layer under pressure in order to create the composite panel 22. Illustratively, after being formed, composite panel 22 may be cut to any suitable length.

Figure 7:
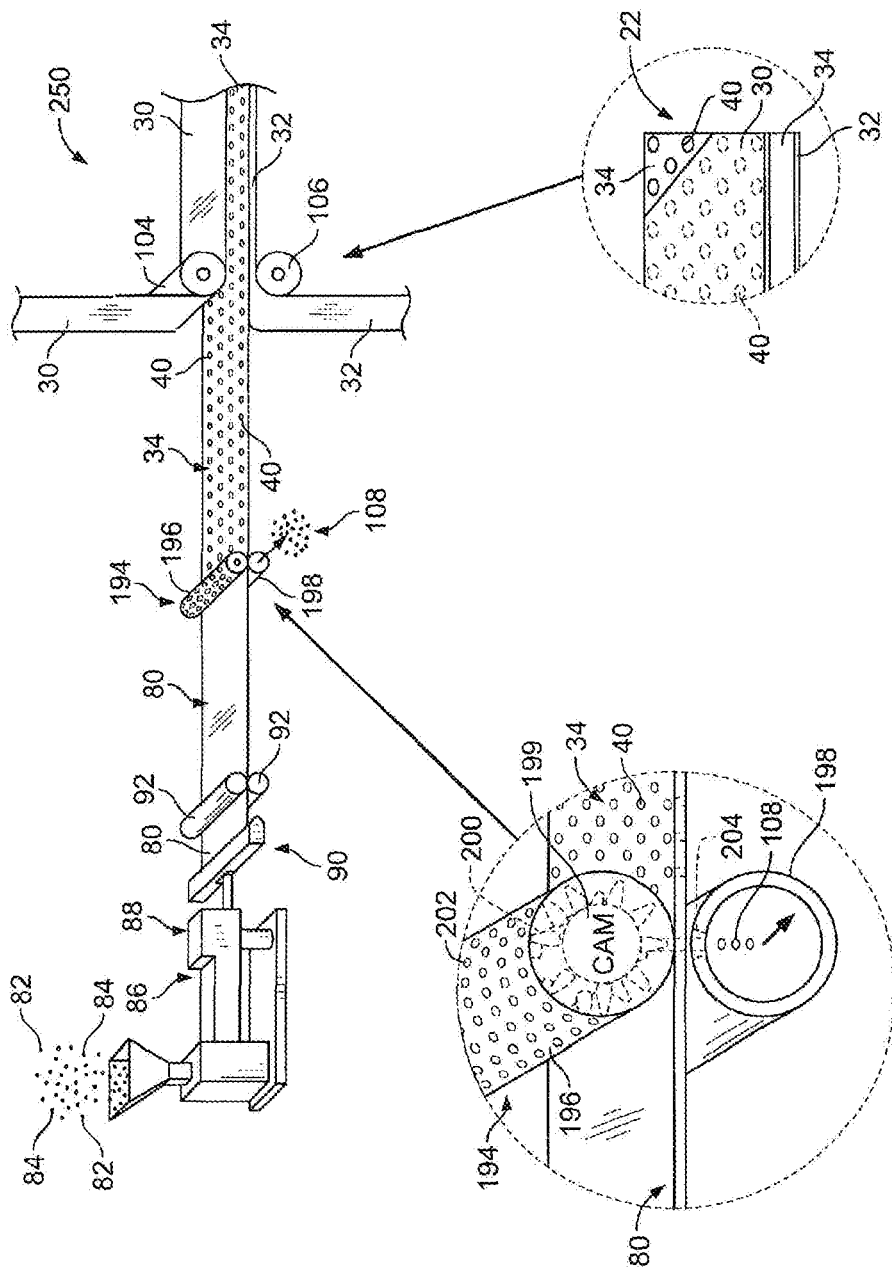
FIG. 7 is a schematic of a second method of making the composite panel of FIG. 2.

Looking now to FIG. 7, an alternative process or method 250 for making the composite panel 22 is schematically illustrated. Illustratively, much of the process includes the same or similar steps; as such, like reference numerals are used to denote like components. In particular, the foamed core sheet 80 is produced in the same manner as that described above in regard to FIG. 6. Once the foamed core sheet 80 is formed, the first set of rollers 92 advances the foamed core sheet 80 to a cam-actuated roller punch cutter 194 which similarly operates to pierce the core sheet 80 in order to form the apertures 40 therethrough. Illustratively, the cam-actuated roller punch cutter 194 includes an upper roller 196 and a lower roller 198 against which the upper roller punch 196 reacts during the punch cutting process. The upper roller 196 includes a cam member 199 having cam-actuated hollow punches 200 coupled thereto. In use, the cam-actuated hollow punches 200 are forced out through punch holes 202 formed in the roller punch 196 as the roller punch 196 is pivoted about its central axis. Further illustratively, the lower roller 198 includes die buttons or apertures 204 through which the core slugs 108 may pass for removal from the process and subsequent recycling. Once the core member 34 is formed through the use of the cam-actuated roller punch cutter 194, the composite panel 22 is formed in the same or similar manner as that described above with reference to FIG. 6.

Figure 10:
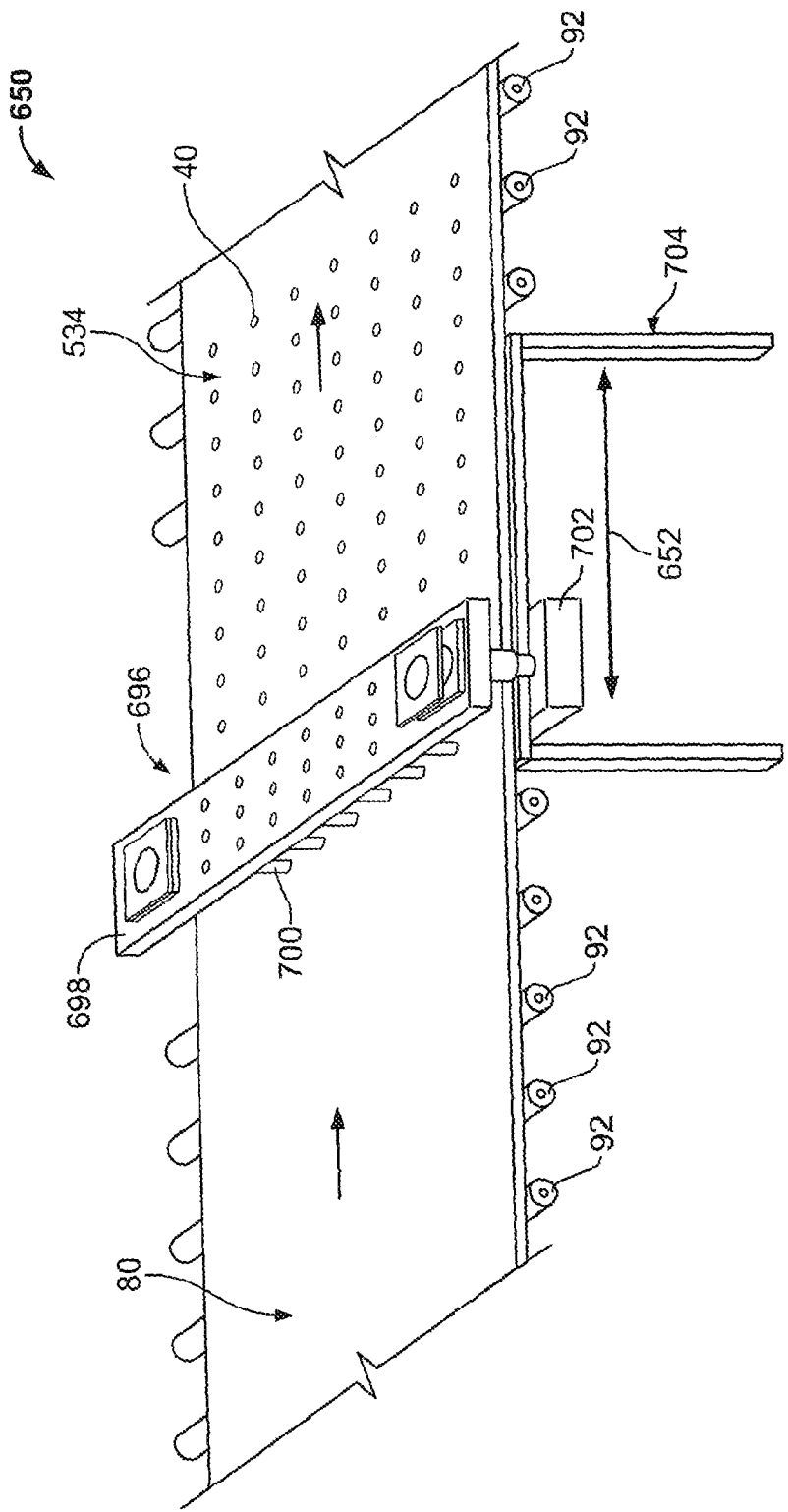
FIG. 10 is a schematic of a fifth method of making a composite panel having an alternative foam core.

In yet another method for producing the core member 34, a bank of vertical punches and underlying die buttons (not shown) may by used. Such punches and die buttons may travel in a synchronized linear motion with the foamed core sheet 80 while making the through-cuts in the foamed sheet 80 to form the apertures 40. The punches may make vertical penetration strokes to form the through-cuts, and after with-drawing from the penetration stroke, the bank of punches may return to a start position and again synchronize with the moving core sheet 80 for the next penetration sequence. As shown in FIG. 10, for example, a method 650 for producing the core member 534 is provided. Illustratively, the foamed core sheet 80 is produced in the same manner as that described above in regards to FIGS. 6 and 7. Once the foamed core sheet 80 is formed, the first set of rollers 92 advances the foamed core sheet 80 to a transversing punch 696. As noted above, the first set of rollers 92 operate to cool the foamed core sheet 80 as it leaves the extruder 90 and is moved toward the punch 696. Illustratively, while only lower rollers 92 are shown in FIG. 10, it should be understood that upper rollers 92 may be provided as well. Further, it should be understood that while only a single upper and lower roller 92 is shown in FIGS. 6 and 7, a plurality of lower and/or upper rollers 92 may be provided in order to advance and cool the foamed core sheet 80 from the extruder 90 to the transversing punch cutter 696.

Once the foamed core sheet 80 is advanced to the transversing punch 696, the transversing punch 696 similarly operates to pierce the core sheet 80 in order to form the apertures 40 therethrough. Illustratively, the transversing punch 696 includes an upper platform 698 including the vertical punches 700 extending downwardly therefrom. The transversing punch 696 illustratively extends across a height of the foamed core sheet 80 from a top edge 50 of the sheet to a bottom edge 52 of the sheet. The transversing punch 696 further includes a lower platform 702 coupled to the upper platform 698 for back and forth movement (shown by arrow 652) therewith. Illustratively, the transversing punch 696 rests on a table 704 for back and forth movement across the width of the table 704.

As noted above, the foamed core sheet 80 is approximately 350° F. upon leaving the extruder 90 and is illustratively cooled by the chilled rollers 92 to approximately 250° F. when the transversing punch 696 forms the apertures 40 therein. As this hot foamed core sheet 80 advances toward the punch 696, the punch 696 moves back and forth along the table 704 while the vertical punches 700 operate to pierce the core sheet 80 to form the apertures 40 therethrough. The core slugs (not shown) produced from piercing the core sheet 80 may fall below and be removed from the process for subsequent recycling. Once the core member 534 is formed through the use of the transversing punch 696, the composite panel 522 (shown in FIG. 12) is formed in the same or similar manner as that described above with reference to FIGS. 6 and 7.

Illustratively, and similar to that discussed above in FIGS. 6 and 7, the composite panels 22, 522 including the respective core members 34, 534 are produced continuously in a line using a "hot" foamed core sheet 80 of approximately 250° F. The apertures 40 are formed in the foamed core sheet 80 while the foamed core sheet 80 is still "hot." Illustratively, it should be understood that the term "hot" should not be limited to a temperature of approximately 250° F., but rather should refer simply to a foamed core sheet 80 that remains rather pliable and flexible and that has not cooled to a state where it is not flexible or pliable and/or has not cooled to room temperature. It should also be understood that the heat from the hot foamed core sheet 80 may affect the tolerances of the equipment used to the punch the apertures 40 in the sheet 80. As such, the equipment, such as the dies 94, 194 and the punch 696 may need to be cooled as they are operating to pierce the apertures 40 in the foamed core sheet 80.

Figure 8:
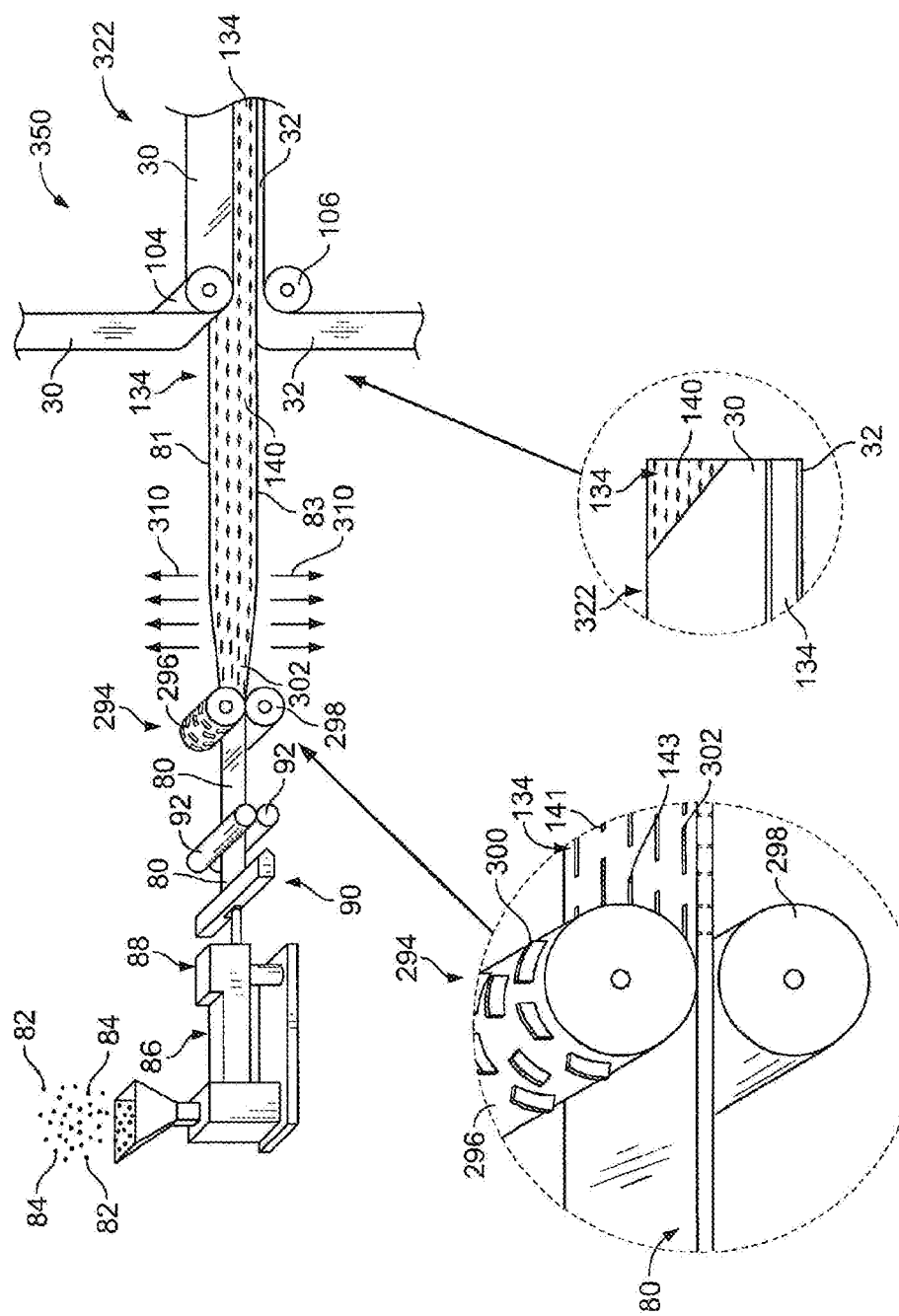
FIG. 8 is a schematic of a third method of making of a composite panel having the foam core of FIG. 5.

Looking now to FIG. 8, a method 350 for making a composite panel 322 including the core member 134 shown in FIG. 5 is schematically illustrated. Illustratively, much of the process includes the same or similar steps as that described above with reference to FIGS. 6 and 7; as such, like reference numerals are used to denote like components. In particular, the foamed core sheet 80 is produced in the same manner as that described above in regards to FIGS. 6 and 7. Once the foamed core sheet 80 is formed, the first set of rollers 92 advances the foamed core sheet 80 to a rotary die cutter 294 including an upper die roller 296 and a lower roller 298. As shown in FIG. 8, the upper die roller 296 includes roller mounted protrusions 300 in the shape of knife-like blades. Illustratively, the blades 300 are thin and slender and operate to pierce the extruded foamed core sheet 80 in a predetermined pattern as the foamed core sheet 80 is advanced between the upper die roller 296 and the lower roller 298. The blades 300 react against the bottom roller 298 to create slots 302 within the foamed core 80.

Looking still to FIG. 8, the roller mounted blades 300 operate to pierce the core sheet 80 in a regular pattern. Illustratively, the slots 302 formed in the foamed core sheet 80 define a longitudinal axis that is parallel to the longitudinal axis of the foamed core sheet 80. In other words, the length of the slots 302 extends along the length of the foamed core sheet 80 such that the slots 302 are also parallel to the upper and lower edges 81, 83 of the foamed core sheet 80. As is discussed below, while the illustrative slots 302 extend along a length of the foamed core sheet 30, it is within the scope of this disclosure form slots 302 which are not parallel to the length, or longitudinal axis, of the foamed core sheet 80 and which are, therefore, angled relative to the longitudinal axis of the foamed core sheet 80.

As opposed to the processes 150, 250 described above (and shown schematically in FIGS. 6 and 7), the die cutting process 350 of FIG. 8 does not create or displace any slugs of material from the core sheet 80. As such, illustratively, no such slugs of material need be extracted from the bottom roller 298 for subsequent recycling or reuse.

Once the slots 302 are formed in the core sheet 80, the now-slotted core sheet 80 is then subjected to width-wise forces 310 to expand the core sheet 80 and the slots 302 formed therein to create the generally diamond-shaped slots 140 of the core member 134. The expanding force 310 is applied at right angles to the core process flow thereby creating the apertures 140 that are generally diamond-shaped. In particular, as shown schematically in FIG. 8, the width-wise forces 310 operated to exert an outward force on the slotted core sheet 80 in outward directions perpendicular to the longitudinal axis of the foamed core sheet 80. Such outward force 310 operates to increase the width of the slotted foamed core sheet 80 while also pulling apart the opposite edges 141, 143 defining each slot 302 in order to form the generally diamond-shaped slots 140. This geometry and increased core width is illustratively retained as the core member 134 is cooled. Illustratively, one or both core sheet edges 81, 83 may be left clear of proximate perforations thereby leaving a continuous material strip for subsequent joining by the use of mechanical or other fastening systems. Once the core member 134 is formed through the use of the die cutter 294, the composite panel 322 is formed in the same or similar manner as that described above with reference to FIGS. 6 and 7.

Alternatively, it should be understood that rather than passing the foamed core sheet 80 through the rotary die cutter 294, as described above and shown in FIG. 8, the protrusions 300 may be mounted to a bank of punches (not shown) which are actuated in a vertical motion in synchronism with the moving core sheet 80 in order to create the slots 302 in the sheet 80.

Figure 9:
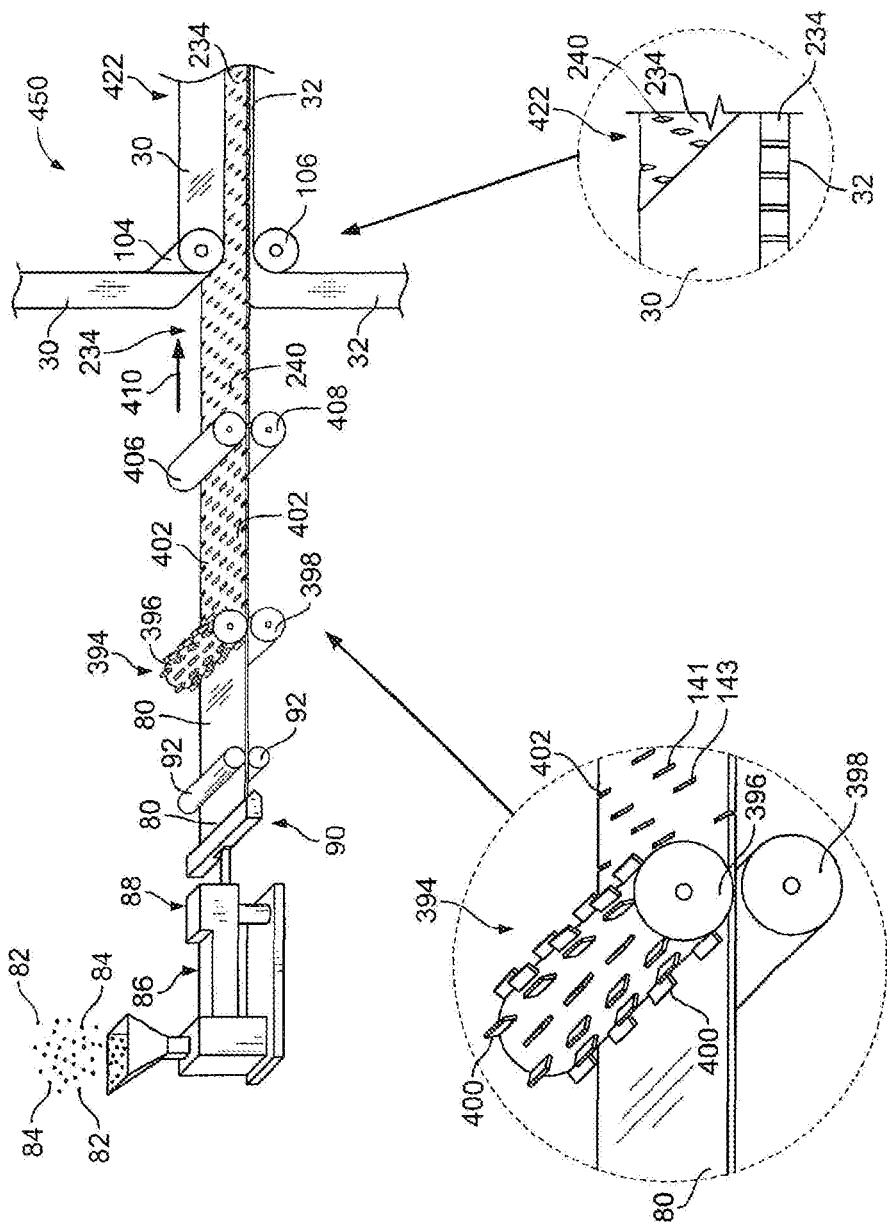
FIG. 9 is a schematic of a fourth method of making a composite panel having an alternative foam core.

Looking now to FIG. 9, a method 450 for making another composite panel 422 including an alternative core member 234 is schematically illustrated. Illustratively, much of the process 450 includes the same or similar steps as that described above with reference to FIGS. 6-8; as such, like reference numerals are used to denote like components. In particular, the foamed core sheet 80 is produced in the same manner as that described above in regards to FIGS. 6-8.

Once the foamed core sheet 80 is formed, the first set of rollers 92 advances the foamed core sheet 80 to a rotary die cutter 394 including an upper die roller 396 and a lower roller 398. As shown in FIG. 9, the upper die roller 396 includes roller mounted protrusions 400 in the shape of knife-like blades. Illustratively, as opposed to the protrusions 300 of the upper die roller 296 shown in FIG. 8, a longitudinal axis of the protrusions 400 is parallel to the longitudinal axis of the upper die roller 396 itself. Illustratively, the blades 400 are similarly thin and slender and operate to pierce the extruded foamed core sheet 80 in a predetermined pattern as the foamed core sheet 80 is advanced between the upper die roller 396 and the lower roller 398. The blades 400 react against the bottom roller 398 to create slots 402 within the foamed core 80.

Illustratively, the roller mounted blades 400 pierce the core sheet 80 in a regular pattern to produce slots 402 at right angles to the core edges 81, 83. In particular, the illustrative slots 402 formed in the foamed core sheet 80 define a longitudinal axis that is perpendicular to the longitudinal axis of the foamed core sheet 80. In other words, the length of the slots 402 extends perpendicularly to the length of the foamed core sheet 80 such that the slots 402 are also perpendicular to the upper and lower edges 81, 83 of the foamed core sheet 80. Similar to the die cutting process 350 of FIG. 8, little or no slugs of material are created or displaced from the core sheet 80 when the slots 402 are formed.

Once the slots 402 are formed in the foamed core sheet 80, the now-slotted core sheet 80 is then passed through upper and lower pull-rollers 406, 408. The pull-rollers 406, 408 operate to subject the slotted core sheet 80 to length-wise, or tensile, forces 410 in the direction of travel to expand the core sheet 80 and the slots 402 formed therein. Subjecting the slots 402 to these tensile forces expands the slots 402 to create generally diamond-shaped slots or apertures 240 of the core member 234. As shown schematically in FIG. 9, the lengthwise forces 410 operate to exert a force on the slotted core sheet 80 along the length of the sheet 80 to increase the length of the slotted foamed sheet 80 while also pulling apart the opposite edges 141, 143 defining each slot 402 in order to form the generally diamond-shaped slots 240. Illustratively, as opposed to the diamond-shaped slots 140 of the core member 134 shown in FIGS. 5 and 8, a length of the diamond-shaped slots 240 of the core member 234 is perpendicular to the length of the core member 134. Once the core member 234 is formed through the use of the die cutter 394, the composite panel 422 is formed in the same or similar manner as that described above with reference to FIGS. 6-8.

Again, alternatively, it should be understood that rather than passing the foamed core sheet 80 through the rotary die cutter 394, as described above and shown in FIG. 9, the protrusions 400 may be mounted to a bank of punches (not shown) which are actuated in a vertical motion in synchronism with the moving core sheet 80 in order to create the slots 402 in the sheet 80.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. In particular, a foamed core member, such as the foamed core members 34, 134, 534, includes apertures 40, 140 formed through a thickness (i.e., from the outer surface 42 to the inner surface 44) of the core member. The apertures of such a foamed core member of the present disclosure may be any suitable shape and size. The apertures may be spaced any suitable distance apart from each other and may be arranged in any suitable pattern and/or may be arranged randomly. Illustratively, the apertures are not interconnected and no single aperture extends between a top edge and a bottom edge of any core member to create a continuous void from the top edge to the bottom edge. Further, no single aperture extends between the side edges of any core member to create a continuous void from the side edges of the core member. The apertures of a core member of the present disclosure may be open to the top, bottom, and side edges 50, 52, 54. Alternatively, the apertures of a core member of the present disclosure may be spaced-apart from the top, bottom, and side edges 50, 52, 54 such that the top, bottom, and side edges of the core member are generally continuous and do not include any formed, or manufactured, voids formed therein. The apertures may be spaced-apart any suitable distance from the edges 50, 52, 54 of the core member. In particular, a distance that is perpendicular from any edge 50, 52, 54 and the center of any adjacent aperture may illustratively be in the range of approximately 0.50 inch-6.00 inches. However, it should be understood that such a distance between the apertures and the edges may be greater than or less than the above-referenced range.

What is claimed is:

1. A method of forming a composite panel in-line, the method comprising:
   forming a hot thermal plastic sheet of material;
   providing the hot thermal plastic sheet of material to a punch having an upper platform with punches extending outwardly therefrom and a lower platform coupled to the upper platform;
   advancing the hot thermal plastic sheet of material through the punch in order to form apertures through the hot thermal plastic sheet of material such that each aperture extends from an outer surface of the hot thermal plastic sheet of material to an inner surface of the hot thermal plastic sheet of material, wherein slugs of material are removed from the hot thermal plastic sheet of material via the punch; and
   coupling an outer metal sheet and an inner metal sheet, respectively, to opposing sides of the hot thermal plastic sheet of material,
   wherein the hot thermal plastic sheet of material is configured to be provided through the punch at a temperature of about 250° F.

2. The method of claim 1, wherein the hot thermal plastic sheet of material is a foamed thermal plastic sheet of material.

3. The method of claim 2, wherein the forming the hot thermal plastic sheet of material includes the steps of (i) mixing foaming pellets and thermal plastic pellets together to form a mixture (ii) heating the mixture of foaming and thermal plastic pellets to activate the foaming pellets and produce one of carbon dioxide and nitrogen gas to foam the thermal plastic pellets, and (iii) extruding the foamed thermal plastic pellets.

4. The method of claim 2, wherein the forming the hot thermal plastic sheet of material includes the steps of (i) heating a plurality of thermal plastic pellets within a chamber, (ii) introducing one of carbon dioxide and nitrogen gas into the chamber to foam the thermal plastic pellets, and (iii) extruding the foamed thermal plastic pellets.

5. The method of claim 2, wherein the foamed thermal plastic sheet of material is selected from the group consisting of HDPE, LDPE, and LDPP.

6. The method of claim 1, wherein the apertures penetrate a full thickness of the hot thermal plastic sheet of material and are substantially evenly spaced throughout the hot thermal plastic sheet of material.

7. The method of claim 1, wherein the slugs of material that are removed are recycled and reused to form additional thermal plastic sheets of material.

8. The method of claim 1, wherein a plurality of composite panels are joined to form a storage container or a trailer.

9. The method of claim 1 further comprising the step of advancing the hot thermal plastic sheet of material over a plurality of rollers before advancing the hot thermal plastic sheet of material through the punch.

10. A method of continuously forming a composite panel along a single production line, the method comprising:
forming a hot thermal plastic sheet of material;
providing the hot thermal plastic sheet of material to a punch having an upper platform coupled to a lower platform;
removing slugs of material from the hot thermal plastic sheet of material via punch members protruding outwardly from the punch; and
coupling an outer metal sheet and an inner metal sheet to opposite surfaces of the hot thermal plastic sheet of material,
wherein the hot thermal plastic sheet of material is configured to be provided through the punch at a temperature of about 250° F.

11. The method of claim 10, wherein the hot thermal plastic sheet of material is provided to the punch at the temperature of about 250° F.

12. The method of claim 11, wherein the temperature of the hot thermal plastic sheet of material is about 250° F. when the slugs of material are displaced.

13. The method of claim 10, wherein the step of forming the hot thermal plastic sheet of material comprises the steps of extruding the hot thermal plastic sheet of material and cooling the hot thermal plastic sheet of material from an extrusion temperature to about 250° F.

14. The method of claim 10 further including the step of applying adhesive to the opposite surfaces of the hot thermal plastic sheet of material prior to coupling the outer metal sheet and the inner metal sheet to the opposite surfaces of the hot thermal plastic sheet of material.

15. A method of continuously forming a composite panel along a single production line, the method comprising:
continuously extruding heated, foamed thermal plastic pellets to form a hot thermal plastic sheet of material;
providing a punch having an upper platform with punches extending therefrom and a lower platform coupled to the upper platform;
providing the hot thermal plastic sheet of material through the punch, wherein the hot thermal plastic sheet of material is advanced past cooling rollers before being provided to the punch to cool the hot thermal plastic sheet of material, wherein the hot thermal plastic sheet of material is pliable after being advanced past the cooling rollers;
forming apertures through the hot thermal plastic sheet of material via the punches of the punch; and
continuously laminating an outer sheet and an inner sheet to opposite surfaces of the hot thermal plastic sheet of material,
wherein the hot thermal plastic sheet of material is configured to be provided through the punch at a temperature of about 250° F.

16. The method of claim 15, wherein the single production line provides the panels in a continuous manner and the punch forms the apertures through the hot thermal plastic sheet of material via an up and down longitudinal movement, but is otherwise stationary with respect to the production line.

17. The method of claim 15, wherein the single production line provides the panels in a continuous manner and the punch forms apertures through the hot thermal plastic sheet of material via an up and down longitudinal movement and the punch also includes lateral movement with respect to the production line.

18. The method of claim 15 further including a step of displacing slugs of material from the apertures formed in the hot thermal plastic sheet of material and recycling the slugs to form additional thermal plastic sheets of material.

* * * * *